US010261650B2

(12) United States Patent
Musa et al.

(10) Patent No.: US 10,261,650 B2
(45) Date of Patent: Apr. 16, 2019

(54) WINDOW GROUPING AND MANAGEMENT ACROSS APPLICATIONS AND DEVICES

(71) Applicant: Oracle International Corporation, Redwood Shores, CA (US)

(72) Inventors: Rami Musa, San Francisco, CA (US); Arin Bhowmick, Fremont, CA (US); Melinda Uhland, San Ramon, CA (US); Christopher Patterson, Los Altos Hills, CA (US); Min Wu, Pleasanton, CA (US); Joseph H. Goldberg, San Carlos, CA (US)

(73) Assignee: Oracle International Corporation, Redwood Shores, CA (US)

( * ) Notice: Subject to any disclaimer, the term of this patent is extended or adjusted under 35 U.S.C. 154(b) by 315 days.

(21) Appl. No.: 14/032,136

(22) Filed: Sep. 19, 2013

(65) Prior Publication Data
US 2014/0282217 A1  Sep. 18, 2014

Related U.S. Application Data

(63) Continuation-in-part of application No. 13/795,678, filed on Mar. 12, 2013, now abandoned.

(51) Int. Cl.
*G06F 3/0481* (2013.01)
(52) U.S. Cl.
CPC .. *G06F 3/0481* (2013.01); *G06F 2203/04803* (2013.01)
(58) Field of Classification Search
CPC ..................................................... G06F 3/0481
USPC ...................................................... 715/781
See application file for complete search history.

(56) References Cited

U.S. PATENT DOCUMENTS

| 5,432,934 A | * | 7/1995 | Levin | G06F 9/4443 726/16 |
| 5,499,334 A | * | 3/1996 | Staab | G06F 3/0481 715/778 |
| 5,892,511 A | * | 4/1999 | Gelsinger | G06F 3/0481 715/790 |
| 6,021,269 A | * | 2/2000 | Lewis | G01S 5/0009 324/76.19 |

(Continued)

OTHER PUBLICATIONS

How to Master Ubuntu's Unity Desktop: 8 Things You Need to Know, May 7, 2012, <URL=http://www.howtogeek.com/113330/how-to-master-ubuntus-unity-desktop-8-things-you-need-to-know/>.*

(Continued)

*Primary Examiner* — Doon Y Chow
*Assistant Examiner* — James T Tsai
(74) *Attorney, Agent, or Firm* — Trellis Intellectual Property Law Group, PC

(57) ABSTRACT

A system and method for facilitating user access to data and software functionality. An example method includes identifying open windows of plural software applications; accessing rules pertaining to one or more behaviors of one or more of the open windows; and using the rules to adjust the one or more behaviors in accordance with a context of each of the open windows. In a more specific embodiment, the one or more behaviors are adjusted via window groupings in accordance with window context, which includes one or more keywords associated with open windows. The example method further includes displaying a search window with a user option to enter a query using keywords. Search results may identify documents that are associated with window groups associated with keywords of the query.

3 Claims, 21 Drawing Sheets

(56) References Cited

U.S. PATENT DOCUMENTS

| | | | | |
|---|---|---|---|---|
| 6,462,757 B1* | 10/2002 | Kao | ............... | G06F 9/4443 715/783 |
| 7,478,339 B2* | 1/2009 | Pettiross | ............... | G06F 3/0481 715/779 |
| 7,735,018 B2* | 6/2010 | Bakhash | ............... | G06F 3/04815 345/419 |
| 2002/0080157 A1* | 6/2002 | Chickles | ............... | G06F 8/34 715/700 |
| 2002/0112247 A1* | 8/2002 | Horner | ............... | G06F 17/30017 725/112 |
| 2005/0216918 A1* | 9/2005 | Kuraishi | ............... | G06F 9/4443 719/316 |
| 2005/0223334 A1* | 10/2005 | Guido | ............... | G06F 3/0481 715/794 |
| 2006/0026636 A1* | 2/2006 | Stark | ............... | H04N 5/44543 725/37 |
| 2006/0224991 A1* | 10/2006 | Stabb | ............... | G06F 9/4443 715/781 |
| 2007/0011612 A1* | 1/2007 | Takemura | ............... | G06F 9/4446 715/705 |
| 2007/0067738 A1* | 3/2007 | Flynt | ............... | H04M 1/72522 715/810 |
| 2008/0034317 A1* | 2/2008 | Fard | ............... | G06F 3/0481 715/781 |
| 2008/0034371 A1* | 2/2008 | Gustafson | ............... | G06F 9/526 718/106 |
| 2009/0187853 A1* | 7/2009 | Noyes | ............... | G06F 3/0481 715/802 |
| 2009/0192985 A1* | 7/2009 | Bolls | ............... | G06F 17/30648 |
| 2010/0169828 A1* | 7/2010 | Kho | ............... | G06F 3/04817 715/810 |
| 2011/0225140 A1* | 9/2011 | Wu | ............... | G06F 17/30867 707/709 |
| 2012/0185794 A1* | 7/2012 | Qin | ............... | G06F 3/04842 715/779 |
| 2013/0254699 A1* | 9/2013 | Bashir | ............... | G06F 3/0481 715/772 |
| 2014/0032575 A1* | 1/2014 | Kiang | ............... | G06F 17/30442 707/754 |
| 2014/0115457 A1* | 4/2014 | Hsu | ............... | G06F 9/4446 715/708 |
| 2015/0193100 A1* | 7/2015 | Strode | ............... | G06F 3/04817 715/765 |
| 2015/0378518 A1* | 12/2015 | Heydlauf | ............... | G06F 9/4443 715/804 |

OTHER PUBLICATIONS

Microsoft, "Windows Search Overview," (ca. 2009), <URL="https://msdn.microsoft.com/en-us/library/windows/desktop/aa965362(v=vs.85).aspx">.*

PeopleSoft Human Resources Training Manual; Apr. 2011; 116 pages.

* cited by examiner

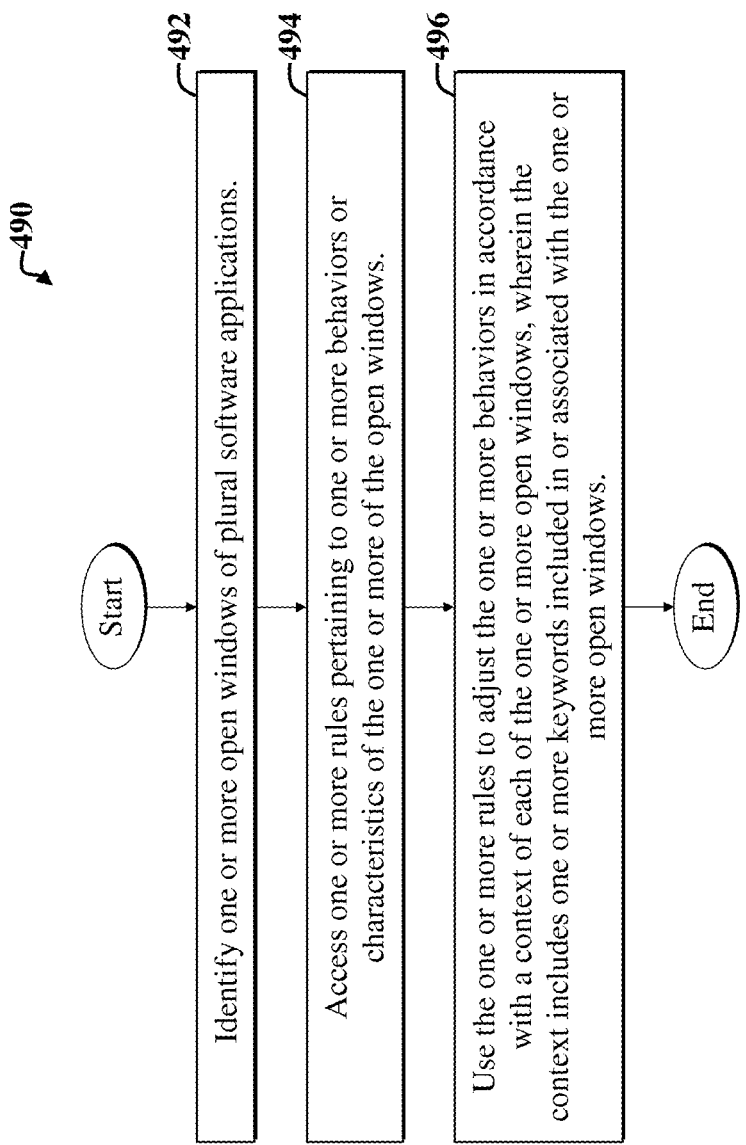

WINDOW GROUPING AND MANAGEMENT ACROSS APPLICATIONS AND DEVICES

CROSS REFERENCES TO RELATED APPLICATIONS

This application is a continuation-in-part of the following application, U.S. patent application Ser. No. 13/795,678, entitled DESIGN AND MANAGEMENT OF MULTIPLE SYNCHRONIZED WINDOWS, filed on May 12, 2013, which is hereby incorporated by reference as if set forth in full in this application for all purposes.

BACKGROUND

The present application relates to software and more specifically to user interface designs and methods for facilitating efficient user access to data and software functionality.

User interface designs and accompanying methods for facilitating user access to data and software functionality are employed in various demanding applications, including enterprise, scientific research, financial analysis, and ecommerce applications. Such application often demand user friendly applications that facilitate efficient management of application windows and content to enable rapid performance of tasks and user access to requisite data and functionality without requiring undue navigation through software menus, windows, and so on.

While working on a particular subject, software users may run multiple applications simultaneously, where each application may display multiple windows. However, users employing multiple applications and windows to work on a particular subject or within a particular context may have difficulty quickly accessing relevant windows. Relevant windows may become lost among potentially hundreds of open windows.

Existing operating systems and applications often lack effective mechanisms for enabling users to control window behaviors to enable users to efficiently access data and functionality relevant to a particular topic or context.

SUMMARY

An example method for facilitating user access to data and software functionality across applications includes identifying one or more open windows of plural software applications; accessing one or more rules pertaining to one or more behaviors or characteristics of the one or more of the open windows; and using the one or more rules to adjust the one or more behaviors in accordance with a context of each of the one or more open windows.

In a more specific embodiment, the context includes or is identified by one or more user-adjustable keywords included in or associated with the one or more open windows. The specific example method further includes displaying a search window with a user option to enter a query, wherein the query includes a keyword.

Search results identify one or more documents that are associated with one or more window groups associated with the keyword. The example method may further include assigning any window that displays content one or more of the documents (of the search results) to a window group associated with the keyword.

The search results may be automatically displayed in the search window. The search results may be alternatively based on a user selected window (i.e., window in focus); a group associated with the user selected window; and one or more keywords associated with the group.

In the specific example embodiment, the one or more open windows include plural windows of different applications, wherein the plural windows are groupable in accordance with the one or more rules. The one or more rules are user adjustable and may include a rule specifying that application windows are to be dynamically grouped into one or more groups in accordance with content of the application windows.

The one or more groups may include one or more subgroups. Each group, including any sub-groups, may also belong to plural window groups. A window is assigned to plural groups when the window meets grouping criteria for different window groups. Example grouping criteria, other than keyword grouping criteria, includes information indicating which application has launched the window. Hence, the example method may further include grouping one or more window groups in accordance with an application from which the one or more window groups were spawned.

The one or more rules may include a rule specifying that windows shall be grouped in accordance with one or more keywords associated with each window group and occurring in each of the one or more open windows. Window group assignments for a particular window may automatically change with window content identified via one or more keywords.

The example method may further include providing a user option to control behaviors of one or more open windows in accordance with window context. The window context may include information pertaining to not only keywords associated with a window group, but which software application spawned a window, which database object was used to provide content for the window, and so on.

Accordingly, windows may be automatically grouped based on keywords identify a window context; search criteria used to automatically display search results in a search window; and based on a group of a parent window that spawned the window. Child windows may be automatically grouped with a parent window and may be further grouped with other window groups based on window context and/or other window grouping criteria.

In an illustrative embodiment, the method further includes automatically determining one or more files or documents that include documentation related to one or more open window groups and accompanying windows based upon one or more keywords assigned to the one or more open window groups. The files or documents may include one or more keywords related to a currently selected window group. The files may include local files and remotely stored files, such as websites and accompanying web pages, remote databases (e.g., web-based data backup services), and so on.

Accordingly, certain embodiments discussed herein may facilitate manual and/or automatic determination of window groups based on common keywords and/or other window context. A user may contribute and edit the keywords to help better identify related windows.

Hence, various embodiments discussed herein provide efficient methods and mechanisms for enabling users to quickly access data in plural windows based on selective window groupings based on window context. A user employing multiple applications and windows to work on a particular subject or within a particular context may now more readily access relevant content. Windows related to and grouped with the current in-focus window become more prominent (e.g., may move forward in front of other windows that are not part of the window group of the selected, i.e., in-focus window) upon user selection of the grouped window.

A user may be working on a topic or subject associated with a given set of windows. As the window context or content changes, window group memberships may change, thereby selectively making potentially relevant windows more prominent on the display. Furthermore, enabling automatic content searches based on keywords identifying a particular context or subject that the user is working on enables relevant files, documents, websites, and so on, to now become more prominent and accessible to the user. Accordingly, window and document prominence may be scaled in accordance with relevance to the current subject matter or context, as identified or defined via keywords.

Hence, certain embodiments discussed herein provide efficient mechanisms for organizing and controlling behaviors of not just windows and accompanying data and functionality, but local and remote documents and links accessible via different windows of different applications to facilitate user access to relevant data and functionality.

A further understanding of the nature and the advantages of particular embodiments disclosed herein may be realized by reference of the remaining portions of the specification and the attached drawings.

BRIEF DESCRIPTION OF THE DRAWINGS

FIG. 21 is a flow diagram of a third example method adapted for use with the embodiments of FIGS. 1-20.

DETAILED DESCRIPTION OF EMBODIMENTS

For the purposes of the present discussion, a web-based application may be any software application that is accessible via a browser, where computer instructions, e.g., computer code, associated with the software application, may be provided as content from a server.

A user interface display screen may be any software-generated depiction presented on a display. Examples of depictions include windows, dialog boxes, displayed tables, and any other graphical user interface features, such as user interface controls, presented to a user via software, such as a browser. A user interface display screen contained within a single border is called a view or window. Views or windows may include sections, such as sub-views or sub-windows, dialog boxes, graphs, tables, and so on. In certain cases, a user interface display screen may refer to all application windows presently displayed on a display.

A user interface control may be any displayed element or component of a user interface display screen, which is adapted to enable a user to provide input, view data, and/or otherwise interact with a user interface. Additional examples of user interface controls include buttons, drop-down menus, menu items, tap-and-hold touch screen functionality, and so on. Similarly, aPage: 8
user interface control signal may be any signal that is provided as input for software, wherein the input affects a user interface display screen and/or accompanying software application associated with the software.

A header, such as a window header or page header, may represent a user interface control if it includes one or more features, e.g., sub-controls, that are adapted to enable a user to initiate a software action.

A software action, also simply called action herein, may be any process or collection of processes implemented via software. Example processes include moving an application window in front of another window, returning or reattaching a detached window to a primary window from which the detached window was detached, adding a window to a group of windows, sticking or pinning a window (as discussed more fully below), synchronizing data or layout settings between windows, updating or editing data in a database, displaying data visualizations or analytics, triggering a sequence of processes, launching an Enterprise Resource Planning (ERP) software application, displaying a dialog box, and so on.

For clarity, certain well-known components, such as hard drives, processors, operating systems, power supplies, routers, Internet Service Providers (ISPs), and so on, have been omitted from the figures. However, those skilled in the art with access to the present teachings will know which components to implement and how to implement them to meet the needs of a given implementation.

Figure 1:
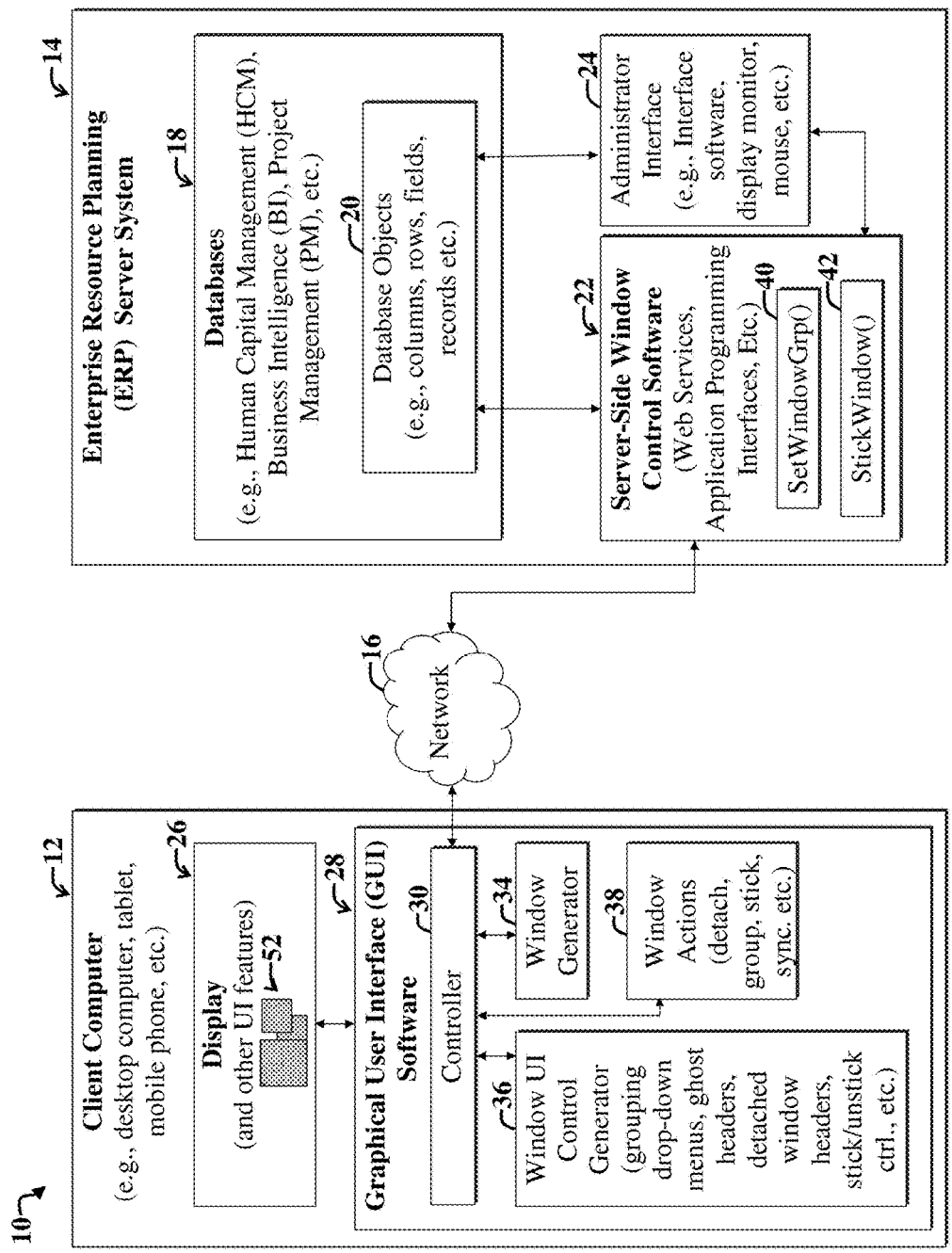
FIG. 1 is a diagram illustrating an example enterprise computing environment and accompanying embodiment of a first example system for facilitating user management of windows, data, and functionality of one or more enterprise applications.

FIG. 1 is a diagram illustrating an example enterprise computing environment and accompanying system 10 for facilitating user management of windows, data, and functionality of one or more enterprise applications, such as ERP databases 18.

For the purposes of the present discussion, an enterprise may be any organization of persons, such as a business, university, government, military, and so on. The terms "organization" and "enterprise" are employed interchangeably herein. Personnel of an organization may include any persons associated with the organization, such as employees, contractors, board members, and so on.

ERP software may be any set of computer code that is adapted to facilitate managing resources of an organization. Example resources include Human Resources (HR), financial resources, assets, employees, customers, business contacts, potential customers, and so on, of an enterprise. The terms "ERP software" and "ERP application" may be employed interchangeably herein. However, an ERP application may include one or more ERP software modules or components, such as user interface software modules or components. An ERP system may be any infrastructure, i.e., resources, such as hardware and ERP software, used to facilitate managing resources of an organization.

An enterprise computing environment may be any collection of computing resources of an organization used to perform one or more tasks involving computer processing. An example enterprise computing environment includes various computing resources distributed across a network and may further include private and shared content on Intranet Web servers, databases, files on local hard discs or file servers, email systems, document management systems, portals, and so on.

In FIG. 1, the example system 10 includes a client computer (also called a client device) 12 in communication with an Enterprise Resource Planning (ERP) server system 14 via a network 16, such as the Internet. The ERP system 14 includes various databases 18, which store database objects 20. While the system 10 is shown including various modules running on the client device 12 and the ERP server system 14, those skilled in the art will appreciate that the various modules may be run on a single computer or multiple computers (e.g., more than two computers), without departing from the scope of the present teachings.

In the present example embodiment, the server-side software 22, such as web services, Application Programming Interfaces (APIs), and so on, may communicate with the database objects 20 to selectively employ data thereby, such as to facilitate implementation of various software applications, which may include server-side and client-side software applications. Generally, server-side implementations involve running applications on the ERP server 14 in response to a request from a client, such as the client computer 12. The server-side application may then send data and/or instructions back to the client device 12. In client-side implementations, software may be downloaded to the client computer 12 and executed locally on the device 12.

The example ERP server system 14 includes an administrator user interface 24, which may include hardware and software functionality for enabling an administrator to make changes to various components of the ERP server system 14, such a settings, installed software, and so on.

The client computer 12 represents an example client device that communicates with server-side window control software 22. Note that client devices other than client desktop computers, e.g., mobile phones, tablets, and so on, may be employed without departing from the scope of the present teachings.

The client computer 12 employs a display 26 in communication with Graphical User Interface (GUI) software 28, which is adapted to facilitate displaying one or more managed windows 52 via the display 26. The GUI software 28 may be any software application or component, such as a spread sheet program, graphing software, and so on, that is adapted to facilitate displaying graphical user interface features and/or data, such as windows, menu items, dialog boxes, and so on.

Note that while the display 26 is shown as a single display, that in practice, various embodiments discussed herein are also applicable to multi-monitor applications and applications that may simultaneously employ monitors of plural devices, e.g., tablets, desktop computers, mobile phones, and so on.

The example GUI software 28 includes a controller 30 in communication with a window generator 34, a window actions module 38, and a window User Interface (UI) controls module 36. The controller 30 includes computer code for coordinating inputs and outputs to and from the modules 34-38 and interfacing the GUI software 28 and accompanying modules 34-38 with the server-side window control software 22.

In an example operative scenario, a user employs the client computer 12 to browse to a website hosted by the ERP server system 14, which provides access to the server-side window control software 22 and accompanying database objects 20. The controller 30 may facilitate downloading database objects 20 from the ERP server system 14 and server-side window control software 22 for use in populating data displayed via managed windows 52 illustrated via the display 26.

The windows 52 are called managed windows herein, as certain embodiments discussed herein provide various mechanisms and user interface features for facilitating controlling and managing various window behaviors, including, but not limited to enabling grouping windows, sticking windows, synchronizing data and functionality between windows, affecting how grouped windows behave when selected, and so on, as discussed more fully below.

In the present example operative scenario, the GUI software 28 selectively downloads database objects 20 from the ERP server system 18. The window generator 34 then employs client-side window-generating software to construct one or more managed windows in accordance with instructions included in the controller 30 and input from the display 26 and/or accompanying user input mechanisms (e.g., mouse, touch screen functionality, keyboard, etc.).

Initial or default methods and algorithms for presenting windows of an application, determining any automatic window groupings and data synchronization behaviors, and so on, may be initially determined by the GUI software 28. The controller 30 may facilitate implementing GUI components and user interface controls to provide user options to group windows, stick windows, resize windows, move related windows or groups of windows in front of or behind other windows, and so on, as discussed more fully below.

Key functionality for adjusting displayed characteristics and behavioral characteristics of managed windows may be included in various functions (e.g., SetWindowGrp( ) 40 and StickWindow( ) 42 functions) of the server-side window control software API 22. The functions 40, 42 may be called remotely via the window generator 34 and controller 30 as needed in response to certain user input, or automatically in accordance with instructions included in the controller 30. Alternatively, the functions 40, 42 may be downloaded to the client computer 12 and run client-side. Functions in addition to or other than those shown, for implementing various embodiments discussed herein, may be included in the server-side window control software 22, without departing from the scope of the present teachings.

The SetWindowGrp( ) function 40 of the server-side window control software 22 may include computer code for facilitating grouping windows displayed via the display 26 and for controlling behavior of grouped windows. When a user employs a user interface control of a window header to add a window to a group, the GUI software 28 may call the SetWindowGrp( ) function 40 to execute code for synchronizing data between displayed grouped windows and for ensuring that when a window of a group is selected, that all windows of the window group are brought forward in front of other windows of the application.

In an example embodiment, if several windows are part of a group, and first window of a group is partially behind a second window of the group, the ordering is said to represent an ordering state. The ordering state may be preserved when grouped windows are brought forward in front of other windows in response to user selection of a window of the group, with the exception that the selected window of the window group is brought forward in front of other windows of the group, if the selected window is not already in front of other windows of the group, as indicated by the ordering state of the window group. However, in certain implementations, stuck windows may be brought forward in front of the selected window. One or more user interface controls may be provided to enable a user to configure behavior of stuck windows, e.g., to control whether or not stuck windows come forward in front of a selected window that is not stuck.

The StickWindow( ) function 42 of the server-side window control software 22 may include computer code for facilitating sticking windows and controlling behaviors of stuck windows. In the present example embodiment, when a window of an application is stuck, selection of any window of the application will cause the stuck window to come forward in front of other unstuck windows of the application and any other running application windows, along with the selected window. The StickWindow( ) function 42 is said to implement a window sticking function, which is responsive to user input via the client computer 12 and accompanying user interface controls included in window or page headers, as discussed more fully below.

Those skilled in the art with access to the present teachings may readily implement the SetWindowGrp( ) function 40, the StickWindow( ) function 42, and the various modules 28-38 of the client computer 12, without undue experimentation.

Note that while the example GUI software 28 is shown included in the client computer 12, implementations are not limited thereto. For example, the GUI software 28 may be incorporated into the server-side window control software 22 and run on the server 14 as a server-side application. The server side application may be run server-side and viewed client-side via browser software running on the client computer 12.

In the present example embodiment, various GUI modules 34-38 include computer code for implementing functionality for adjusting how managed windows are displayed via the display 26. Example window UI controls, which may be implemented in part via the window UI controls module 36, include drop-down menus and window sticking controls (e.g., buttons or icons) in window and/or page headers, such as ghost headers and/or headers of detached windows or accompanying pages, for facilitating grouping windows, sticking windows, detaching windows from a primary window, sending a detached window back to a primary window, and so on, as discussed more fully below.

Example window actions 38 include detaching, sticking, and grouping windows in response to user selection of one or more UI controls generated by the window UI control generator 36.

Figure 2:
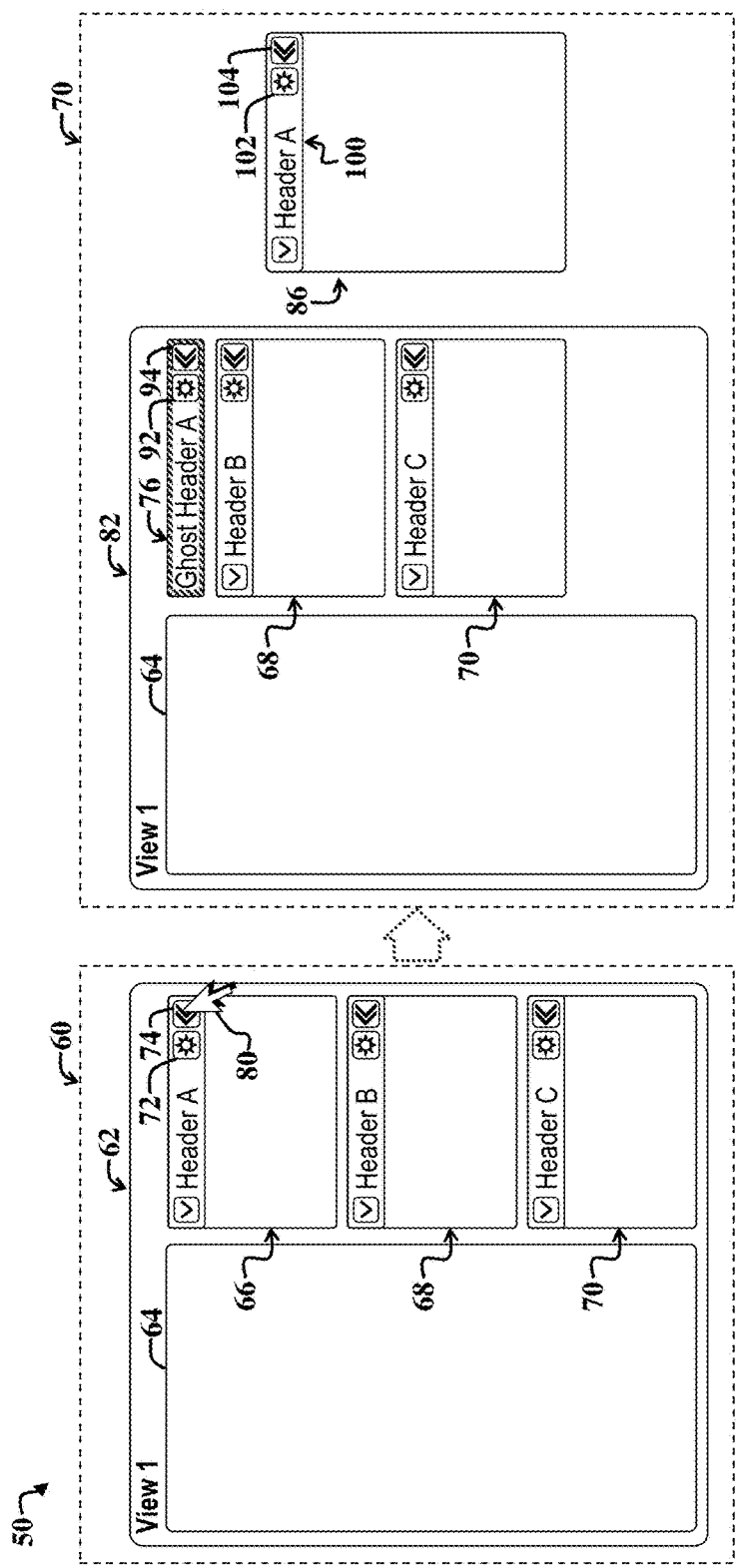
FIG. 2 shows a first example set of user interface display screens illustrating detachment of a section of a primary window, resulting in a detached window in response thereto.

FIG. 2 shows a first example set of user interface display screens 50, including a first screen 60 and a second screen 70, illustrating detachment of a section 66, i.e., sub-window, of a first primary window 62, resulting in a detached window 86 in response thereto. The first example screen 60 includes the first primary window 62, which includes various sections 64-70, including a first sub-window 66, a second sub-window 68, and a third sub-window 70. The sub-windows 66-70, also simply called windows herein, are vertically arranged on a right portion of the first primary window 62 to the right of and adjacent to a larger window section 64.

For the purposes of the present discussion, a primary window may be any window that includes one or more sections, e.g., sub-windows, which can be detached from the primary window to result in one or more additional windows, called detached windows, that are different than the primary window. A detached window may be any window that is separate from a first window, but which was created in response to user selection of a user interface control or other feature of the first window. A primary window is also called a parent window herein.

The sub-windows 66-70 include user interface controls 72, 74 in sub-window headers (Headers A-C). The user interface controls 72, 74 are adapted to facilitate enabling a user to detach the sub-windows 66-70 from the first primary window 62 and to enable reattachment of a window when detached, such as the detached window 86.

In the present example embodiment, the first user interface control 72 is called a menu button, since user selection thereof may result in display of a drop-down menu that includes additional user interface controls for initiating software actions pertaining to the sub-window or any corresponding detached windows, as discussed more fully below. The second user interface control 74 may act as a detach button or an attachment button (e.g., when the accompanying window is detached), such that user selection of the button 74 results in detachment of the sub-window from the first primary window 62.

The second screen 70 represents the first screen 60 after detachment of the sub-window 66 from the first primary window 62. In addition to the detached window 86, the second screen 70 includes an updated version 82 of the first primary window 62 showing that the first sub-window 66 has been detached from the first primary window 62, leaving the ghost header 76 in its place in the updated primary window 82.

In an example operative scenario, a user employs a mouse cursor 80 (simply called a mouse herein) to select a detach button 74 of a header (Header A) of the first sub-window 66. Upon user selection of the detach button 74, the first screen 60 transitions to the second screen 70. The second screen 70 shows that the first sub-window 66 has become detached from the first primary window 62 in response to user selection of the detach button 74.

The ghost header 76 left in place of the first window 66 (corresponding to the detached window 86) includes user interface controls 92, 94, including a menu button 92, and an attachment button 94, corresponding to the original menu button 74 and attachment button 94, respectively. The user interface controls 92, 94 may be used to affect the detached window 86, which has been separated from the first primary window 62 corresponding to the updated primary window 82 of the second screen 70. For example, user selection of the attachment button 94 may result in reattachment of the detached window 86 to the updated parent window 82, resulting in transition of the screen 70 back to the screen 60.

For the purposes of the present discussion, a ghost header, such as the ghost header 76, may be any window header that lacks an accompanying window that was previously coupled to or associated with the header. A header may be any section of a user interface display screen providing window identification information (e.g., "Header A") or one or more user interface controls or widgets (e.g., controls 92, 94) pertaining to a window (e.g., the detached window 86). Ghost headers are generally detached from, i.e., not positioned adjacent to the window identified by the identification information in the ghost header.

Hence, ghost header mechanisms and functionality discussed herein can also (i.e., in addition to conventional window headers) be applied to tabs, menus and accompanying menu items, and other user interface controls, without departing from the scope of the present teachings.

While certain embodiments discussed here illustrate detachment of a section of a primary window and leaving behind a corresponding ghost header in the parent window or view to provide easy access to the detached window's status and to provide controls to manipulate the detached window from the ghost header and from the detached window itself, embodiments are not limited thereto. For example, in certain implementations, detached windows, also called secondary windows, may be detached or launched from a menu in response to user selection of one or menu items adapted to generate detached windows in response to user selection thereof. In this case, the menu may provide access to the status of the detached window and provide access to controls to manipulate it. Accordingly, the menu and accompanying user options provided thereby may play the role of a ghost header or ghost region. In general, the ghost header concept may be extended and used with various types of User Interface (UI) widgets, without departing from the scope of the present teachings.

The detached window 86 includes user interface controls 102, 104, including a detached window menu button 102 and reattachment button 104 in a detached window header 100. The detached window menu button 102 and reattachment button 104 correspond to the menu button 92 and attachment button 94, respectively of the ghost header 76 remaining in the updated parent window 82.

The detached window menu button 102 may enable display of a drop-down menu for controlling (and implementing applicable actions pertaining to) the detached window and the updated parent window 82. For example, user selection of the detached window reattachment button 104 may result in reattachment of the detached window 86 to the updated parent window 82, thereby transitioning the second screen 70 back to the first screen 60.

Hence, both the ghost header 76 and the associated detached window 86 have user interface controls that may enable control of the detached window 86, such that the detached window 86 can be controlled from two locations.

Note that exact details pertaining to software actions applicable to the detached window 86 and the updated primary window 82 may be implementation specific and may vary depending upon the needs of a given implementation, without departing from the scope of the present teachings. Furthermore, while buttons (e.g., 92, 94, 102, 104) in headers (e.g., the ghost header 76 and Header A of the detached window 86) are employed to facilitate implementing software actions, that other types of user interface controls and other locations of the user interface controls may be employed, without departing from the scope of the present teachings. For example, in certain implementations, keyboard shortcut keys are employed to affect software actions pertaining to the updated parent window 82, ghost header 76, and corresponding detached window 86.

As another example, while the buttons 102, 104 of the detached window 86 are shown included in the window header 100, that the buttons 102, 104 may be positioned in another location, such as in a page header of a page displayed in a body of the detached window 86. Note that the detached window 86 and any other windows that are subsequently detached from the parent window 82 may be resized, repositioned, overlapped by other windows, and so on.

Furthermore, while the user interface display screens 60, 70 illustrate detachment of one sub-window 66 from the first primary window 62, several sub-windows and/or different sub-windows or other sections may be detached from the first primary window 62. Furthermore, while various sub-windows 66-70 may be detached from the first parent window 62 via user interface controls appearing in sub-window headers, embodiments are not limited thereto. For example, in certain implementations, a user may employ a mouse to drag a bounding box around a portion of the first primary window 62 to affect selection of a section of the primary window 62. A subsequent right-click menu option for detaching the section within the bounding box may facilitate detachment of a section of the first primary window pertaining to the region or section contained within the bounding box.

In summary, in the present example embodiment, when a user detaches a region or section of a parent window, resulting in a detached window, a ghost header persists in the parent window, keeping a reference to the original place of the detached content of the detached window. This also allows users to easily apply actions to detached windows from the detached windows or from the corresponding ghost headers.

Figure 3:
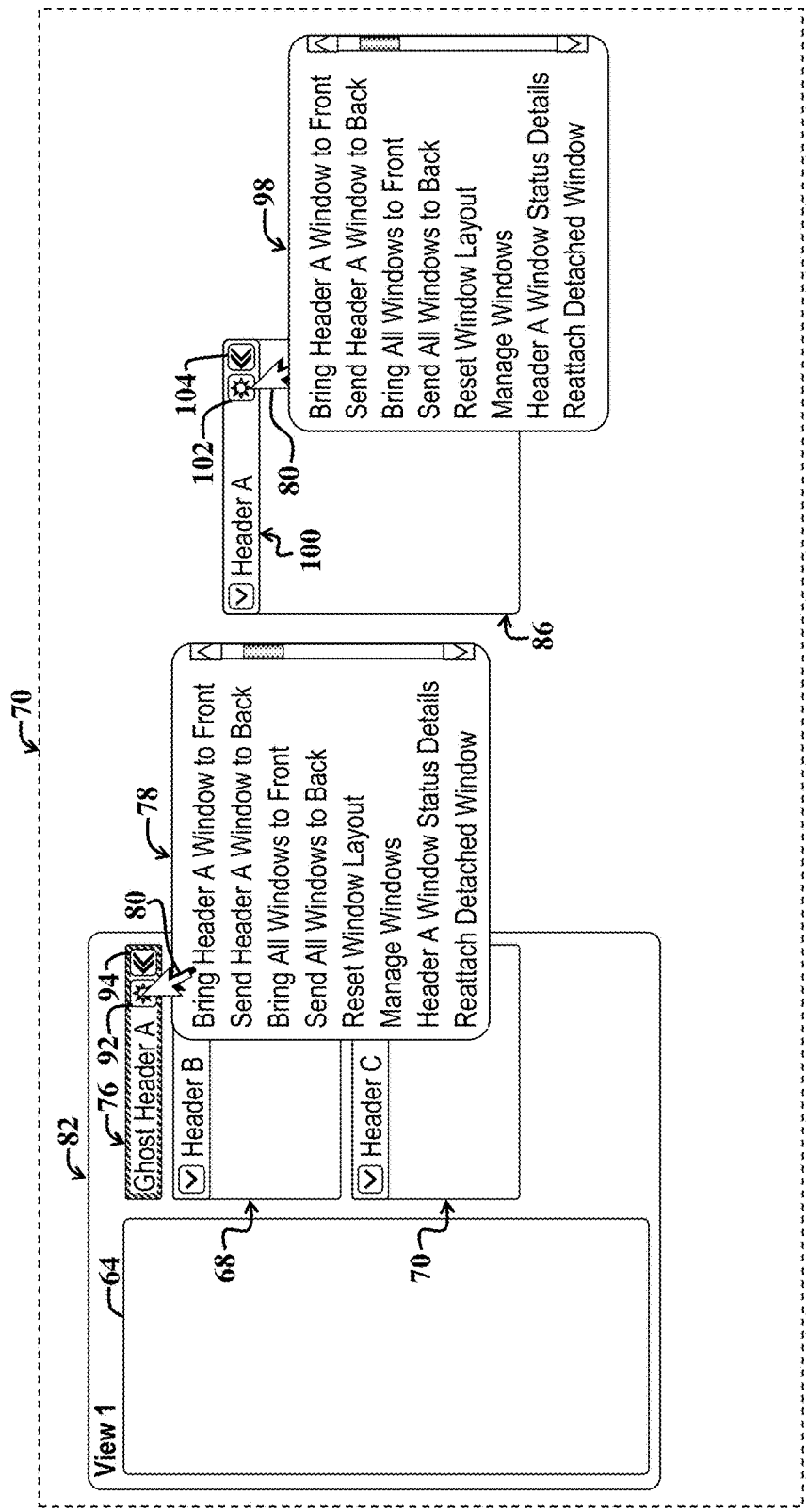
FIG. 3 shows one of the example user interface display screens of FIG. 2 after a user has activated example drop-down menus via a ghost header of a primary window and via a header of a corresponding detached window.

FIG. 3 shows one of the example user interface display screens 70 of FIG. 2 after a user has activated example drop-down menus 78, 98 via the menu button 92 of the ghost header 76 of the primary window 82 and via the corresponding menu button 102 the header 100 of the associated detached window 86.

The first menu 78 and the second menu 98 are substantially similar and include various user options for initiating software actions affecting the primary window 82 and/or detached window 86. For example, the menus 78, 98 include user options for bringing a detached window forward in front of other windows and for sending a detached window behind other windows. Other windows may include any windows that are part of the same software application that generates the windows 82, 86 and may further include any windows of other concurrently running applications.

A third menu item of the drop-down menus 78, 98 represents a user option to bring all windows of the software application forward in front of other windows. A fourth menu item represents a user option to send all windows of the software application behind any other displayed windows that overlap windows of the software application responsible for generating the windows 82, 86. A fifth menu item represents a user option to reset the window layout of the software application. For example, selection of the reset window layout option may cause the detached window 86 to return to the parent primary window 82, resulting in the user interface display screen 70 appearing similar to the user interface display screen 60 of FIG. 2.

A sixth menu item of the drop-down menus 78 represents a user option to manage windows. User selection of the manage windows option may result in generation of an additional window or dialog box with user interface controls for adjusting additional parameters and behaviors of windows.

The additional window may represent a one stop user interface for managing all windows of an application. For example, the additional window may include user options for displaying a list of all attached and detached windows. A user may then scroll or navigate the list as needed to pick windows for reattachment or detachment, for sticking, for grouping, for bringing forward, for saving window layouts, for creating new window layouts, and so on. Such features may enable users to manage all windows at once.

Exact details of a resulting manage window dialog box are implementation specific and may vary, depending upon the needs of a given implementation. In general, various user options provided via the drop-down menus 78, 98 are illustrative and implementation specific, such that they may vary depending upon the needs of a given implementation, without departing from the scope of the present teachings.

One or more additional user interface controls (e.g., buttons, menu items, etc.) may be accessible via a ghost header or header of a detached window for facilitating viewing, displaying, or otherwise enabling user access to status information (e.g., whether a window is detached, part of a group, stuck, etc.) pertaining to a window, e.g., a detached window; for enabling a user to reattach a detached window to a parent window, and so on. Additional user interface controls and accompanying functionality may enable various other actions (than those discussed above) to be performed remotely on a detached window from the ghost header in a parent window, without departing from the scope of the present teachings. For example, additional controls for facilitating configuring window data synchronization behaviors, configuring behaviors of stuck windows, configuring behaviors of grouped windows, and so on, may be provided.

In certain implementations, when a detached window is part of a group, the associated menus 78, 98 may include additional user options for triggering various actions that may apply to an individual detached window and/or to the detached window and other windows of the group to which the detached window belongs. For example, an additional menu item "Bring Group to Front" may be provided. Such additional user options may enable users to fully control and affect detached windows and accompanying behaviors, including those of individual windows, groups of windows, or all windows simultaneously (e.g., as exemplified by the "Bring All Windows to Front" user option).

In general, user productivity may be substantially enhanced by employing embodiments discussed herein to enable users to perform manipulations (e.g., bring detached windows forward/backward, sticking/unsticking, grouping/ungrouping, etc.) on a detached window from a ghost header and from the detached window itself.

Figure 4:
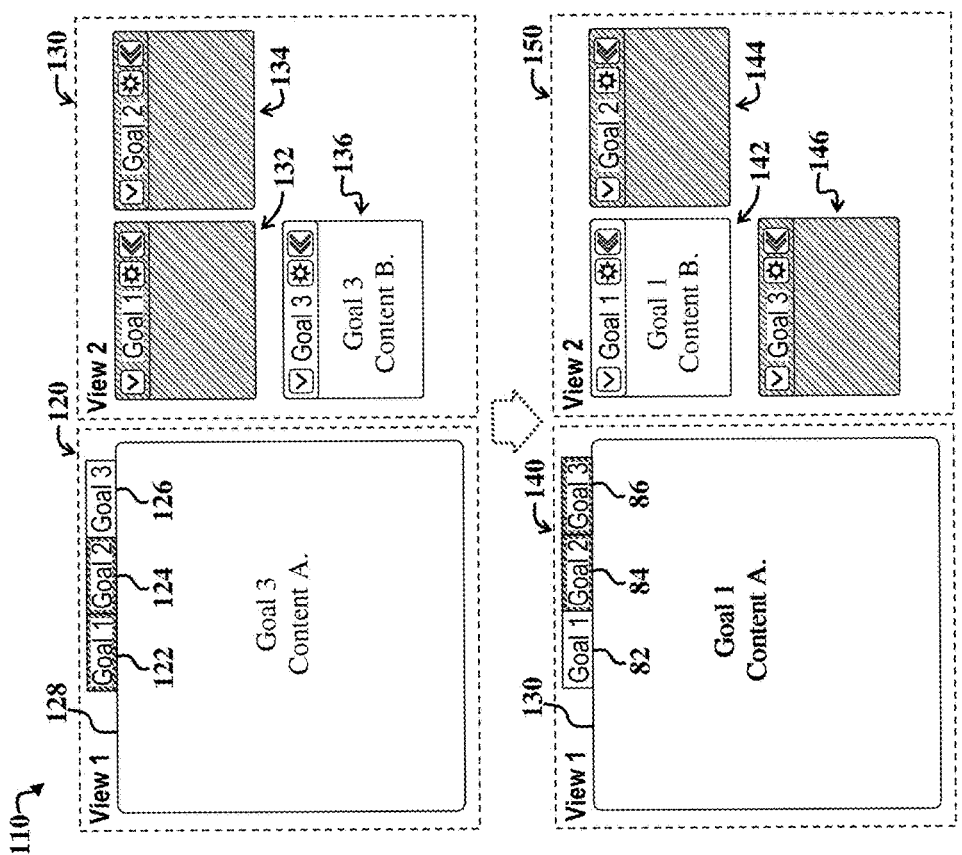
FIG. 4 shows a second example set of user interface display screens illustrating window context maintenance and further illustrating selection of detached windows in response to selection of corresponding headers remaining in a primary window after a detached window is created from a section of the primary window.

FIG. 4 shows a second example set of user interface display screens 110 illustrating window context maintenance (also called context synchronization) and further illustrating selective enabling/disabling of windows 136, 142 or features thereof in response to selection of corresponding headers 126, 82 in a primary window 120, 140.

In FIG. 4, a first view 120 includes various tab headers 122-126 and accompanying tab bodies, where a third tab with a "Goal 3" header 126 is selected. Content (e.g., Goal 3 Content A) may be included in a tab body 128 associated with the third header 126. In the present example embodiment, user selection of the third header 126 brings a third window 136 into focus, and causes greying-out of (or partial disabling of features, e.g., data entry features of) a first window 132 and a second window 134, which correspond to a first tab header 122 and a second tab header of the first view 120, respectively.

In an example operative scenario, various goals (e.g., Goal 1-Goal 3) represent customers being assisted. For example, Goal 3 may pertain to a third customer that is being assisted via a corresponding separate third chat window 136 for Goal 3. Example content included in the tab body 128 associated with the third header 126 may include details pertaining to the third customer currently being assisted. Example content (e.g., Goal 3 content B) included in the third window 136 may include content of an electronic chat conversation occurring between a user and the third customer.

When a user switches from assisting the third customer to assisting a first customer (e.g., corresponding to Goal 1), the user may select the first goal header tab 122, resulting in the selected header 82 and corresponding tab body 130 (e.g., corresponding to a Goal 1 header 82) being brought into focus. This results in bringing into focus a Goal 1 window 142 and greying-out of (or disabling data entry functionality of) windows 144, 146 pertaining to other customers who are not currently being assisted. Hence, when a user switches context in a first primary view 120, 140, context is automatically maintained by adjusting focus of other related windows (e.g., shown second views 130, 150) accordingly. Context is said to be maintained, since changing context in any view or window, automatically switches the context in all the other views or windows accordingly.

In certain embodiments, the various headers 122-126, 82-86 are considered ghost headers, and the corresponding windows 132-136, 142-146 have been detached from portions of the tab bodies (e.g., tab bodies 128, 130). In implementations where the various headers 122-126, 82-86 are ghost headers, and the windows 132-136, 142-146 represent detached windows, both context maintenance and data synchronization may occur between data in a tab body and data maintained in associated detached windows.

In this case, the first set of user interface display screens 120, 130 may further illustrate that upon user selection of a third ghost header 126, a corresponding third window 136 is brought into focus, i.e., selected. Hence, the selected third ghost header 126 is shown highlighted relative to the unselected first ghost header 122 and the second ghost header 124. Similarly, the third window 136 is shown highlighted relative to the unselected first detached window 132 and second detached window 134. In the present example embodiment, the detached windows 132-136, 142-146 may include data and functionality applicable to the associated goals being addressed.

Similarly, in a second set of user interface display screens 140, 150, a user has selected a first ghost header 82, leaving a second ghost header 84 and third ghost header 86 unselected. Accordingly, the first detached window 142 (corresponding to the first ghost header 82) is shown selected, whereas the second detached window 144 and the third detached window 146 are shown unselected.

Similarly, user selection of one or more of the detached windows 132-136, 142-146 may result in corresponding selection of one or more of the ghost headers 122-126, 82-86. Note that, in the present example embodiment, the ghost headers 122-126, 82-86 may also act as tabs, such that content of a primary window body 128, 130 changes dependent upon the selected tab.

The content, e.g., data, tables, graphs, and/or other user interface features of the primary window body 128 may be automatically synchronized with the corresponding detached windows 132-136, 142-146. Alternatively, synchronization is not automatic per se, but is triggered in response to user selection of one of the tabs 122-126, 82-86.

Figure 5:
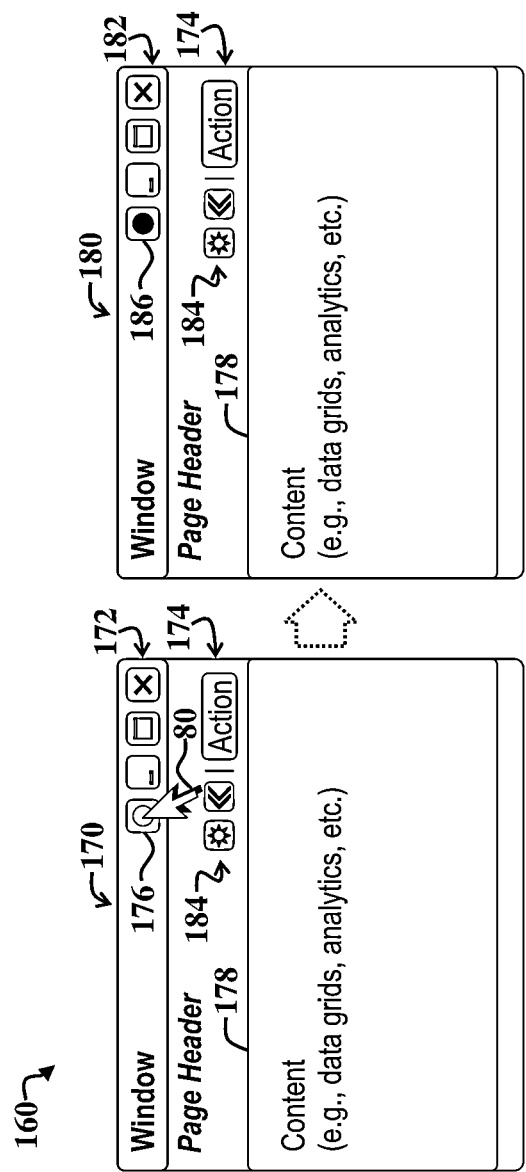
FIG. 5 shows a third example set of user interface display screens illustrating user interface controls in headers of detached windows for sticking and unsticking detached windows.

FIG. 5 shows a third example set of user interface display screens 160 illustrating user interface controls 176, 186 in headers of detached windows 170, 180 for sticking and unsticking detached windows 170, 180. A second window 180 represents an updated version of a first window 170 after user selection of a sticking control 176, also called a stick icon, in a window header 172.

After user selection of the sticking control 176 in the first window 170, the first window is updated by darkening the control, resulting in an updated control 186, as reflected in an updated header 182 of the updated window 180. The updated control 186 indicates that the updated window 180 is stuck.

For the purposes of the present discussion, a window is said to be stuck, if the window behavior is such that selection of any window of the application associated with the window results in bring forward the stuck window in front of any other windows of the application.

In FIG. 5, menu buttons, attachment/detachment buttons, and other user interface controls 184 are included in window page headers 174. The page headers 174 are positioned above window bodies 178, which may include window content, such as data and functionality.

For the purposes of the present discussion, functionality may include any function or set of functions, actions, operations, mechanisms for performing a task via software and may further include any user interface controls, or features and any hardware or software module, device component, and so on, that performs or otherwise enables one or more functions, capabilities, or tasks.

In summary, a user may employ a mouse 80 to click the stick icon 176 to keep the associated window in focus whenever the associated software application is in focus. This may help users keep the window 180 accessible, thereby preventing the window 186 from getting buried behind the windows of other applications that might be open on a desktop. Other windows that a user wishes to have open and readily accessible, but that are accessed less frequently, can be left unstuck. When a user wishes to access an unstuck window, the unstuck window may be easily accessed from a ghost header or tab of a primary window or otherwise directly selected to bring the window into focus, i.e., to select the window.

Figure 6:
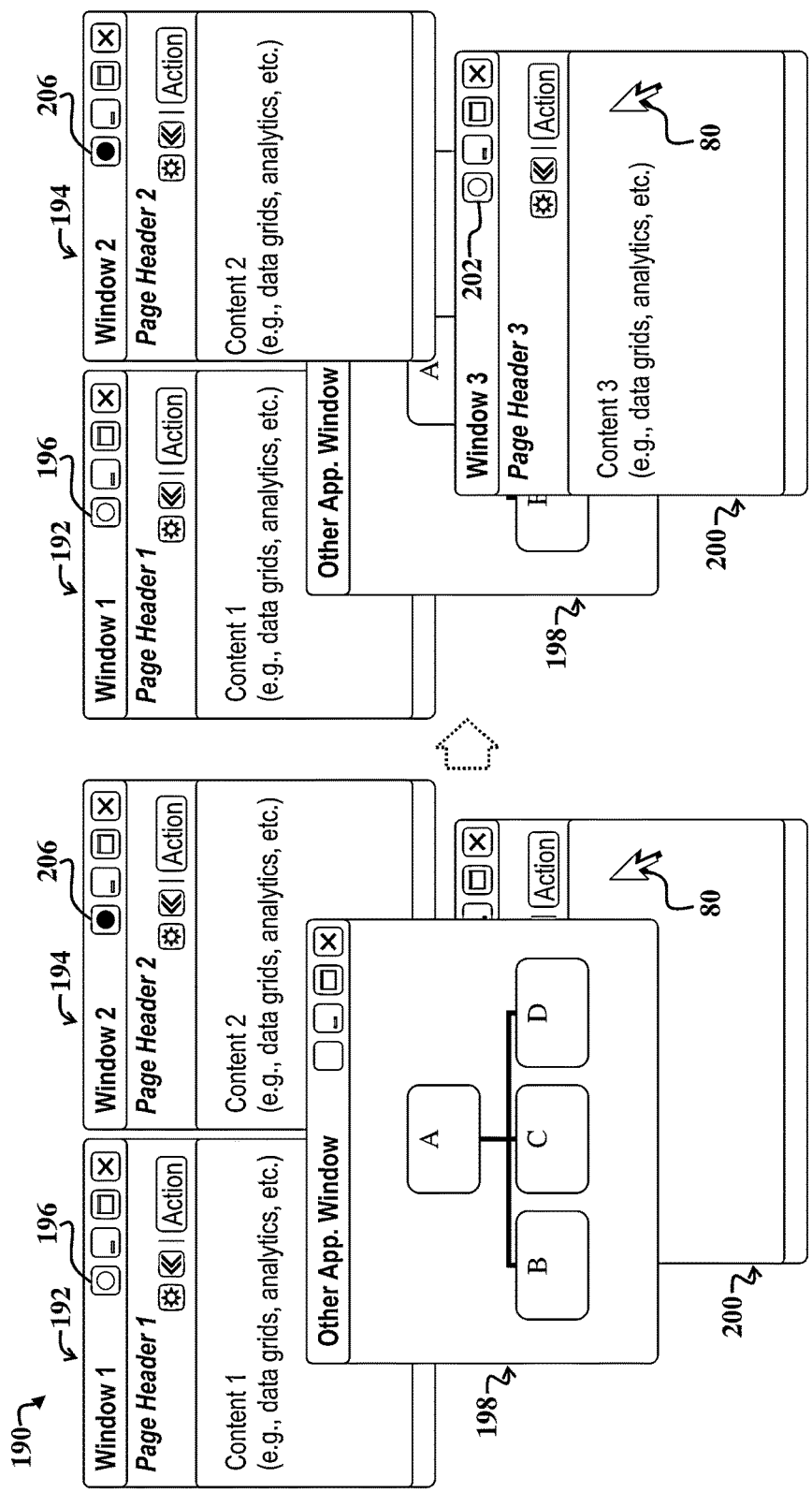
FIG. 6 shows a fourth example set of user interface display screens illustrating example behavior of a stuck detached window upon user selection of another window of the same application.

FIG. 6 shows a fourth example set of user interface display screens 190 illustrating example behavior of a stuck detached window 194 upon selection of another window 200 of the same application. The user interface display screens 190 include a first window 192, a second window 194, and a third window 200 of the same software application. Another window 198 of a different application is initially shown overlapping the three windows 192, 194, 200. Upon user selection of the third window 200, e.g., via a mouse 80, both the selected window 200 and the second window 194 move in front of the other application window 198.

A first stick icon 196 of the first window 192 illustrates that the first window 192 is unstuck. A second stick icon 206 of the second window 194 indicates that the second window 194 is stuck. A third stick icon 202 of the third window 200 indicates that the third window 200 is unstuck.

Since the second window 194 is stuck, user selection of any of the windows 192, 194, 200 of the same application will cause the second window 194 to move in front of all other windows (other than the selected window), including the other application window 198. The other application window 198 may be a window that is generated from an application different from the application that generated the first window 192, the second window 194, and the third window 200.

Accordingly, user selection of the third window 200 causes both the third window 200 and the second stuck window 194 to move in front of all other windows, other than the selected window 200 itself. Note that the first window 192 remains behind other application windows upon user selection of the third window 200, since the first window 192 is unstuck.

In summary, in the present illustrative embodiment, a user employs the mouse 80 to select the third window 200, thereby bringing the window 200 forward along with the stuck window 194. The stuck window may automatically come into focus.

In general, a stuck window that comes forward in front of other windows may remain behind the selected window that triggered bringing the stuck window forward. However, in certain implementations, stuck windows may come forward in front of the selected window, e.g., if the selected window is not also stuck. In cases where stuck windows overlap, the overlapping order of stuck windows may be preserved when stuck windows are brought forward in front of other unstuck windows.

Figure 7:
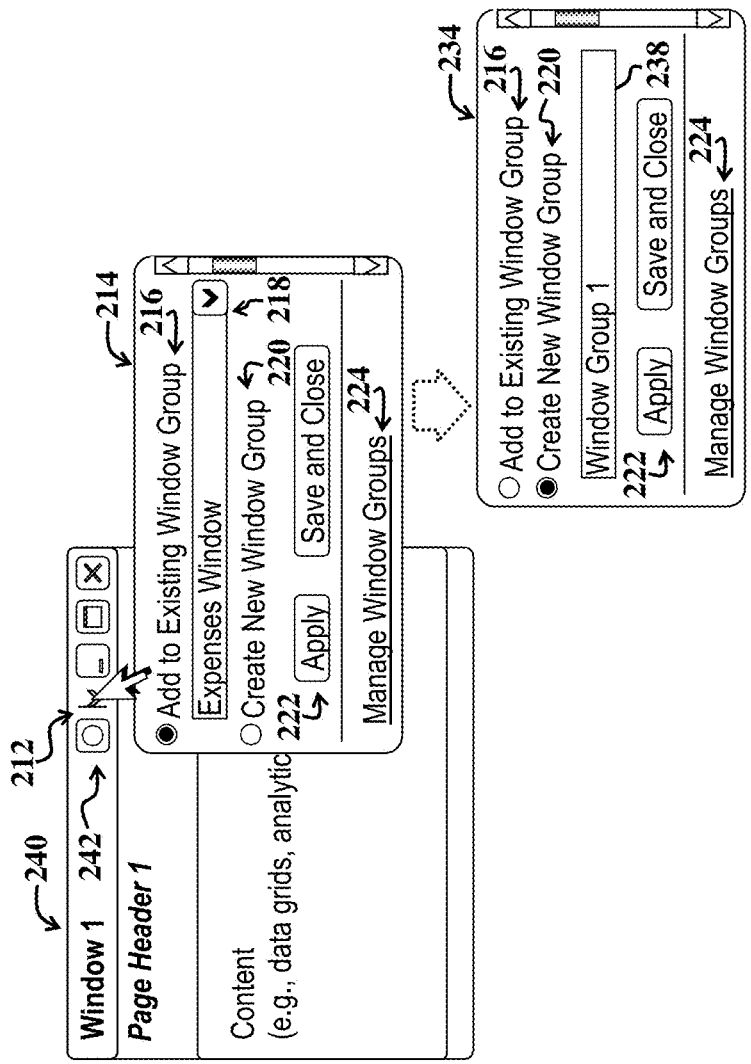
FIG. 7 illustrates a header and accompanying user interface controls of a detached window for adding an ungrouped window to a window group.

FIG. 7 illustrates a header and accompanying user interface controls 242 of a detached window 240 for adding an ungrouped window to a window group. The user interface controls 242 include a grouping control 212, also called a grouping button. User selection of the grouping button 212 results in display of a first drop-down menu 214, which includes various additional controls 216-224 for facilitating creating and/or specifying a window group to enable adding the window 240 thereto. The first drop-down menu 214 transitions to the second drop-down menu 234 depending upon which controls of the first drop-down menu 214 are selected.

The first drop-down menu 214 includes a group-selection radio button control 216 and accompanying drop-down selection control 218. The drop-down selection control 218 appears in response to user selection of the group-selection radio button 216. The drop-down selection control 218 provides a drop-down list of user selectable previously created window groups from which a user may choose to assign the window 240 to.

The first drop-down menu 214 further includes a group-creation radio button control 220 and controls 222 for applying and/or saving user inputs provided to the first drop-down menu 214 and for closing the drop-down menu 214. Another control 224 represents a user option to manage window groups. User selection of the manage window groups control 224 may result in display of another window or dialog box wherein a user may make additional adjustments to existing window groups; wherein a user may create additional window groups, and so on.

Note that window group memberships may also be managed from a central location, e.g., from a window or dialog box that is displayed in response to user selection of a "Manage Windows" option from a drop-down menu, such as that included in the drop-down menus 78, 98 of FIG. 3. Note that a user option for triggering a user interface display screen for managing window group memberships may be provided via another mechanism, e.g., a button or other user interface control, other than a menu item included in a drop-down list.

The manage window groups control 224 may represent a user interface control and accompanying option an action applicable to all windows of a window group associated with the header. Example actions include sticking all windows of a window group; triggering data synchronization between all windows of a windows group; saving group layouts for use on other computing platforms and/or displays, and so on.

Note that data synchronization is not limited to data synchronization between windows of a window group. However, in certain specific implementations, data synchronization may be limited to occurring between windows of a particular window group. In other implementations, all windows of an application (or set of running applications), including the primary window and detached windows, may be synchronized. In other implementations, one or more user interface controls may enable users to turn on or off synchronization behaviors between open application windows.

In the first drop-down menu 214, a user has chosen to add the window 240 to an expenses window group specified via the drop-down selection control 218. If the user then applies this selection, e.g., by selecting an apply button of the additional controls 222, then the header of the window 240 will be updated to indicate that the window 240 is part of the expenses window group.

However, for illustrative purposes, in the present example embodiment, instead of applying the expenses window selection, the user instead selects the create new window group radio button control 220, which transitions the first drop-down menu 214 to the second drop-down menu 234. The second drop-down menu 234 is similar to the first drop-down menu 214, with the exception that the group-selection radio button 216 is unselected; the drop-down selection control 218 is removed; the group-creation radio button control 220 is selected; and a window group creation field 238 is shown.

The window group creation field 238 provides a mechanism enabling a user to specify a name for a window group to be created. In the present case, the user has entered "Window Group 1." After applying the input and closing the drop-down menu 234, a new window group called Window Group 1 is created, and the window 240 is added to the group Window Group 1.

For the purposes of the present discussion, a window group may be any collection of one or more windows identified by a common name, called the group name. In certain embodiments discussed herein, certain behaviors may be applied to windows of a group.

For example, selection of one window of a group may cause all windows of the group to move forward in front of other application windows that are not part of the window group. Furthermore, data displayed in each window of a group may be synchronized, such that when data is changed in one window of the group, corresponding adjustments are made to data displayed in other windows of the same group. This is called data synchronization between windows of a window group. The windows of a window group are said to be linked via window linking.

Software and accompanying methods for implementing window linking is known in the art and may readily be adapted for use in embodiments discussed wherein without undue experimentation.

Figure 8:
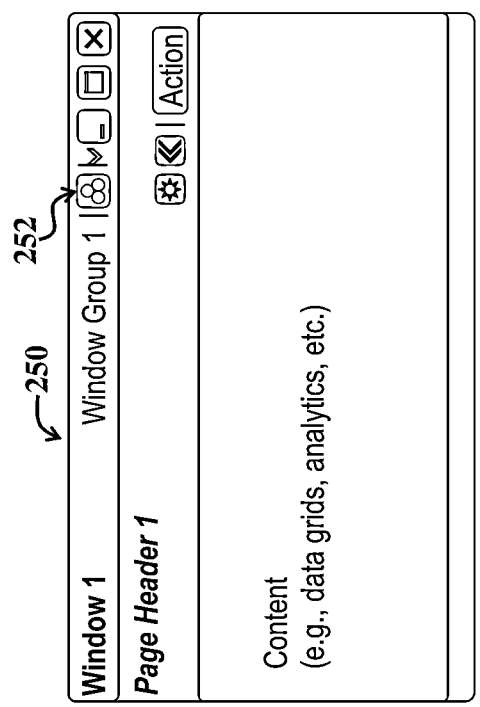
FIG. 8 illustrates the detached window of FIG. 7 after the detached window has been added to a group, but before the resulting grouped window has been stuck.

FIG. 8 illustrates the detached window 240 of FIG. 7 after the detached window 240 has been added to a group, but before the resulting grouped window 250 shown in FIG. 8 has been stuck.

Figure 11:
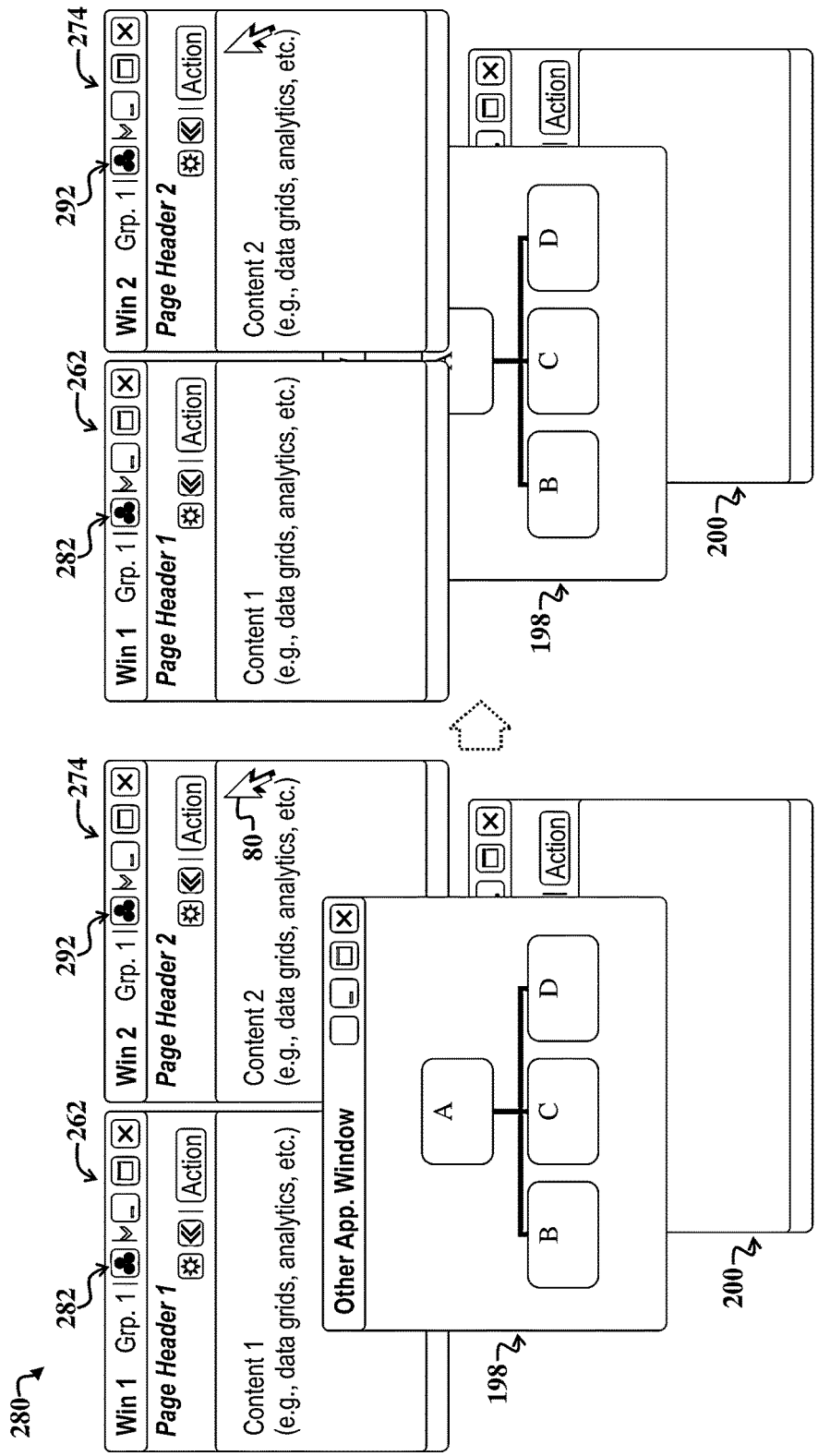
FIG. 11 shows a seventh example set of user interface display screens illustrating example behavior of grouped and stuck windows upon user selection of a stuck and grouped window of the same application.

In the updated window 250, a stick icon has been replaced with a group stick icon 252, and the window header has been updated to indicate that the window 250 is now part of Window Group 1. Appearance of the group stick icon 252 also indicates that the window 250 is part of a window group, and further indicates that the window is unstuck, by virtue of the color or opacity of the group stick icon 252. When the grouped window 250 is stuck, the group stick icon 252 will darken, e.g., as shown in FIG. 11 below.

Figure 9:
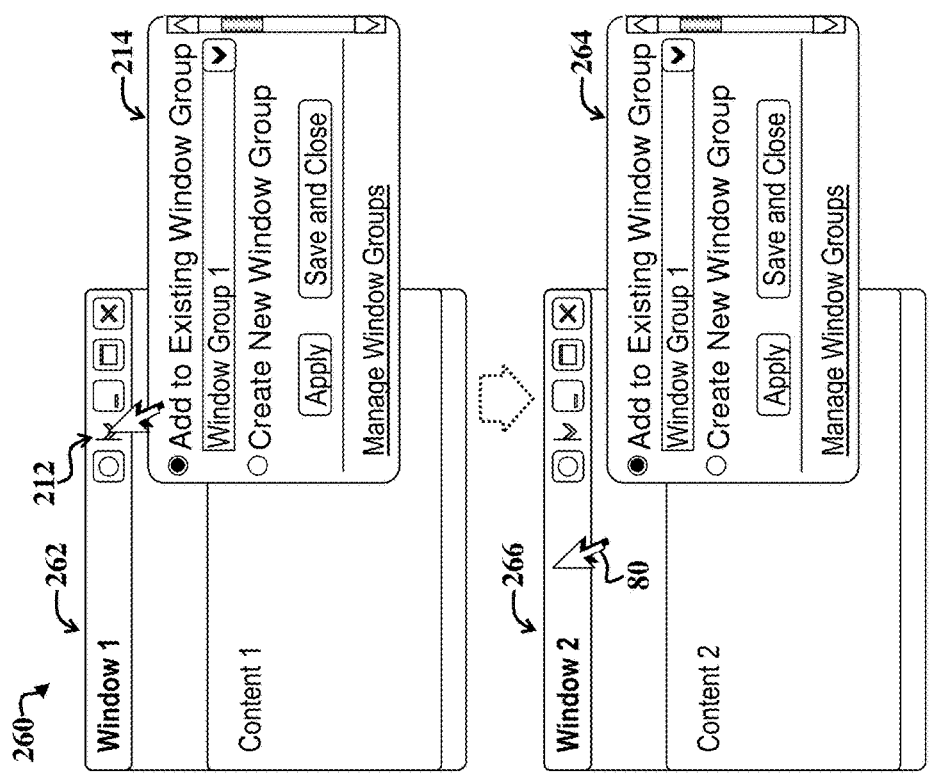
FIG. 9 shows a fifth example set of user interface display screens illustrating operation of a mechanism for facilitating adding detached windows to a group when a group drop-down menu is open.

FIG. 9 shows a fifth example set of user interface display screens 260 illustrating operation of a mechanism for facilitating adding detached windows 266 to a group when a group drop-down menu 214 is open.

In the present example embodiment, a user has employed the header grouping control 212 in a first window 262 to display the group drop-down menu 214. When the group-drop menu 214 is open and displayed, user selection (e.g., via the mouse 80) of other open windows, e.g., a second detached window 266 results in automatic display of an associated group drop-down menu 264. The associated group drop-down menu 264 will appear with similar user selections as the first group drop-down menu 214. This facilitates quickly adding open windows to a newly selected or newly created window group.

In summary, to facilitate adding several windows to a group, once the user expands a drop-down menu that defines the groups, the user can click other windows, and the modal state is applied to the selected windows and the associated drop-down menu (e.g., menu 264) is shown. The window group information is pre-filled. The user may simply click an apply button, and the two windows (e.g., windows 262 and 266) then become part of the same group (e.g., Window Group 1).

Alternatively, when the first group drop-down menu 214 is activated and open, user selection of other windows triggers automatic addition of the selected windows to the window group specified in the first drop-down menu 214.

Once a user clicks Apply, the status of the group stick icon 212 changes to indicate that the window(s) 262, 266 is/are grouped and unstuck. When stuck, the group stick icon, as discussed more fully below, with change to reflect that the window is both grouped and stuck.

Note that while in the present example embodiment, only one additional window 266 is shown being added to a group along with the first window 262, that several additional windows may be added to the group specified by the first drop-down menu 214.

A generalized method for facilitating adding windows to a window group may be summarized as follows: upon user selection of a window group or user creation of a window group, while the group drop-down menu is activated, providing a user option to select one or more open windows of the plural detached windows, automatically deploying a drop-down menu in each selected window in response thereto, wherein the deployed drop-down menu includes one or more user options for specifying a window group to assign to the selected one or more open windows.

Note that the first window 262 and the second window 266 may represent detached windows, which have been detached from similar or different primary windows, i.e., parent windows. Accordingly, in certain embodiments, different window groups may include windows from different parent or primary windows. Furthermore, note that detached windows, which may represent sub-windows or sub-sections of parent or primary windows, may themselves include sections or sub-windows, which may be separated, resulting in additional detached windows.

Figure 10:
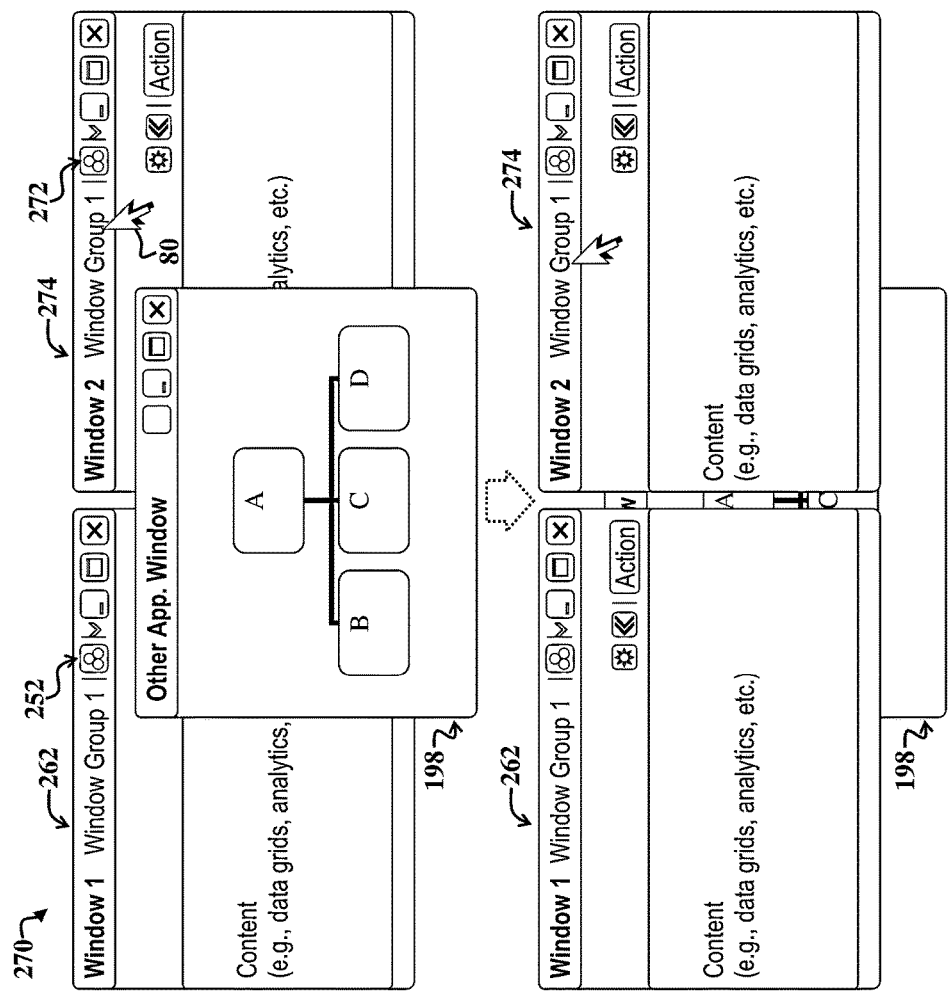
FIG. 10 shows a sixth example set of user interface display screens illustrating example behavior of grouped, but unstuck windows.

FIG. 10 shows a sixth example set of user interface display screens 270, illustrating example behavior of grouped, but unstuck detached windows 262, 274. The detached windows 262, 274 are grouped but unstuck, as indicated by the group stick icons 252, 272.

The detached windows 262, 274 are initially behind (also called in back of) an application window 198 from a different application than that which generated the first window 262 and the second window 274. Note however, that the other application window 198 may be generated by the same underlying software application that generated the first and second windows 262, 274, without departing from the scope of the present teachings.

In the present example embodiment, a user employs the mouse cursor 80 to select the second window 274 or the first window 262, which results in the windows 262, 274 being moved forward in front of the other window 198. Accordingly, the other window 198 is moved behind, i.e., in back of first window 262 and the second window 274.

In summary, windows belonging to the same window group (e.g., Window Group 1) come forward into focus together. Note that while only one other window 198 is shown, that several windows that are part of the same application or different applications may be moved behind windows of a group corresponding to a selected window.

If the first window 262 were originally positioned behind the second window 274, then user selection of the second window 274 would result in moving the other window 198 behind both the first window 262 and the second window 274, but the relative position order of (e.g., ordering state of) the second window 274 relative to the first window 262 may be preserved. Accordingly, the first window 262 would remain behind the second window 274. If, however, the first window 262 were selected, then the first window 262 would move forward, such that is positioned on top of (also called in front of) the second window 274, which would be positioned on top of, i.e., in front of, the other application window 198.

In the present example embodiment, the first window 262 and the second window 274 are automatically synchronized, such that changes in data or functionality of one window may be automatically propagated to other windows, which are then adjusted accordingly. For the purposes of the present discussion, windows are said to be synchronized if changes to one window are propagated to other windows. The changes could be changes to data, displayed layouts, and so on.

FIG. 11 shows a seventh example set of user interface display screens 280, illustrating example behavior of grouped and stuck windows 262, 274 upon user selection of a stuck and grouped window 274 of the same application.

In the present example embodiment, the first window 262 and the second window 274 are grouped and stuck, as indicated by darkened group stick icons 282, 292. Three windows 262, 274, 200 of the same application are initially positioned behind another application window 198. A user then employs the mouse cursor 80 to select one of the stuck and grouped windows 262, 274. This results in movement of the stuck windows 262, 274 in front of all other windows 198, 200, whether or not the other windows 198, 200 are part of the same application or window group as the first window 262 and second window 274.

For the purposes of the present discussion, when a set of windows are grouped, the set of windows always come forward together when any windows of the set of windows is selected, e.g., clicked, by the user. In the present specific embodiment, if one window of a window group is stuck, this results in the sticking of all windows of the associated window group, such that the window group is said to be stuck.

When a group of windows of an application is stuck, then user selection of a another window, e.g., a window that may or may not be part of the group, causes all windows of the group to move forward in front of other windows that are not stuck, but may remain behind the application window that was selected. The overlapped order of any overlapping grouped windows may be remain preserved. For example, if a first grouped and stuck window is initially behind a second grouped and stuck window of the same group, then selection of another window of the application may bring the first and second grouped and stuck windows forward in front of other windows of the application (other than the selected window), while keeping the first window behind the second window.

If windows of a window group overlap, then when the grouped windows are brought forward, the overlap order among windows of the window group may be substantially preserved. However, the selected window of the window group that was selected to bring other windows of a window group forward may remain the topmost window. However, embodiments are not limited thereto. For example, an ordering of grouped windows may be altered in accordance with another scheme when grouped windows are brought forward. For example, a selected window is not required to remain on top in certain implementations.

In summary, windows of window groups can be stuck and unstuck as a group. They can come forward when either is clicked because they are a group. When the windows in a group are unstuck, then selecting one will bring all of the grouped windows forward. When they are stuck, then selecting any window in the application will bring the entire group forward even if the clicked window is not a member of the group but belongs to the same application. The selected window may remain on top. Hence, in general, multiple windows can be stuck individually, or an entire window group can be stuck by sticking one of its group members.

Figure 12:
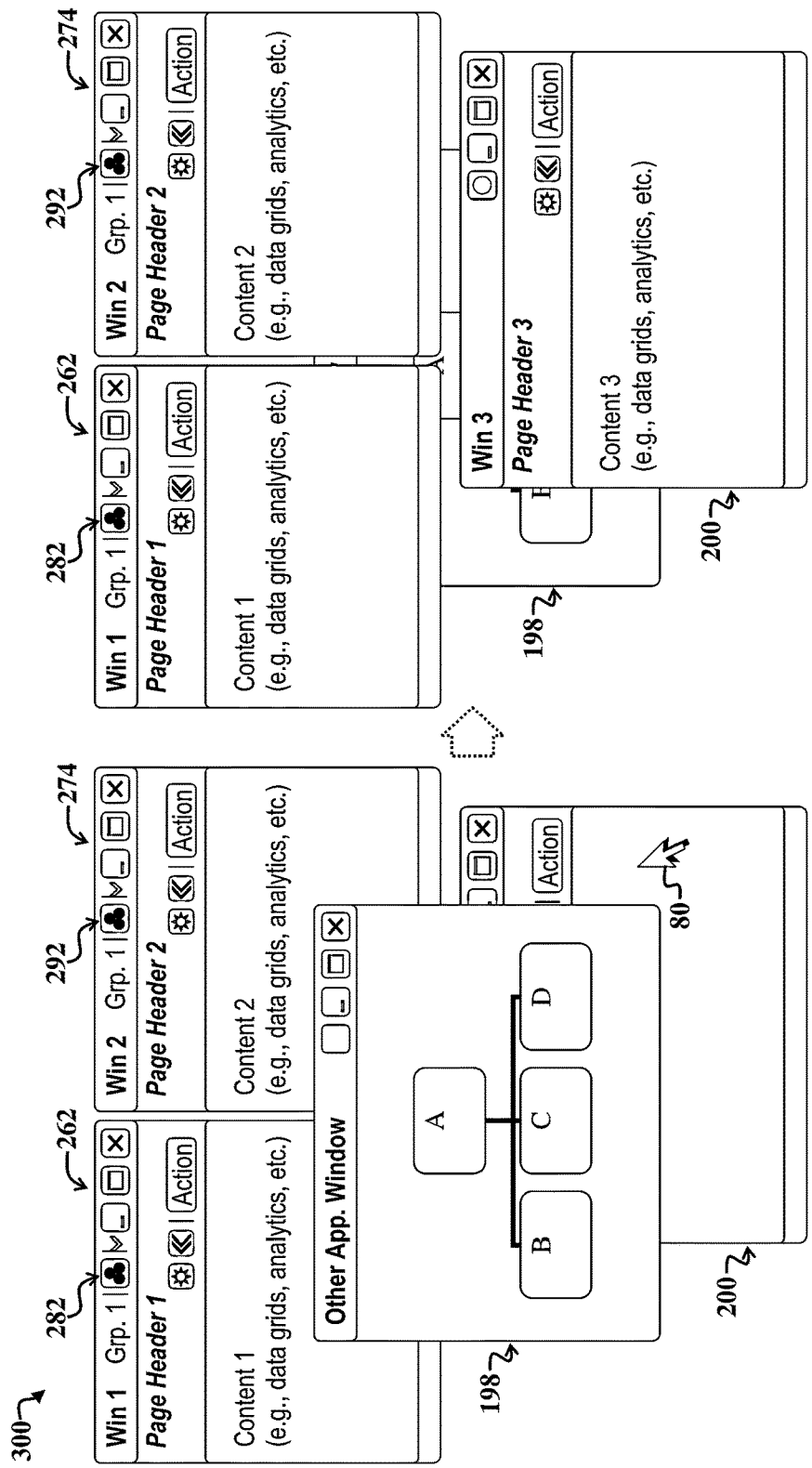
FIG. 12 shows the seventh example set of user interface display screens illustrating example behavior of grouped and stuck windows upon user selection of an unstuck and ungrouped window of the same application.

FIG. 12 shows the seventh example set of user interface display screens 300 illustrating example behavior of grouped and stuck windows 262, 274 upon user selection of an unstuck and ungrouped window 200 of the same application.

In the present example embodiment, a user employs the mouse 80 to select the third window 200, which is unstuck and ungrouped. Since the first window 262 and second window 274 are grouped and stuck, as indicated by accompanying group stick icons 282, 292, both the first window 262 and the second window 274 move in front of the other application window 198 in response to user selection of any other window (e.g., the third window 200) of the same application that generated the first window 262 and the second window 274. Furthermore, the selected third window 200 moves in front of all other displayed windows.

If the third window 200 had initially been behind the first window 262 and/or the second window 274, then user selection of the third window 200 would still cause the third window 200 to move in front of other windows, including the first window 262 and the second window 274. However, the first window 262 and the second window 274 would still move in front of other application windows, e.g., the window 198 and any other windows of the same or different application that are not stuck.

In summary, stuck groups of windows come forward together when any of the stuck windows is selected and also when any other part of the application is brought into focus, i.e., selected.

Note that when any windows of a group are stuck, then windows of the group behave differently than if none of the windows were stuck. For example, if the windows 262, 274 were not stuck, then user selection of the third window 200 may result in the third window 200 moving in front of the other application window 198, while the first window 262 and the second window 274 remain behind the other application window 198.

Note that while in the present example embodiment, all windows of a window group are automatically stuck when one window of a window group is stuck, embodiments are not limited thereto. For example, in certain implementations, individual windows of a window group may be stuck, while other windows of the same window group remain unstuck. In such cases, unstuck windows of a window group may be left behind other windows of the underlying application or other application upon user selection of another application window 198, whereas stuck windows of the window group will be brought forward in front of the other application window 198.

Figure 13:
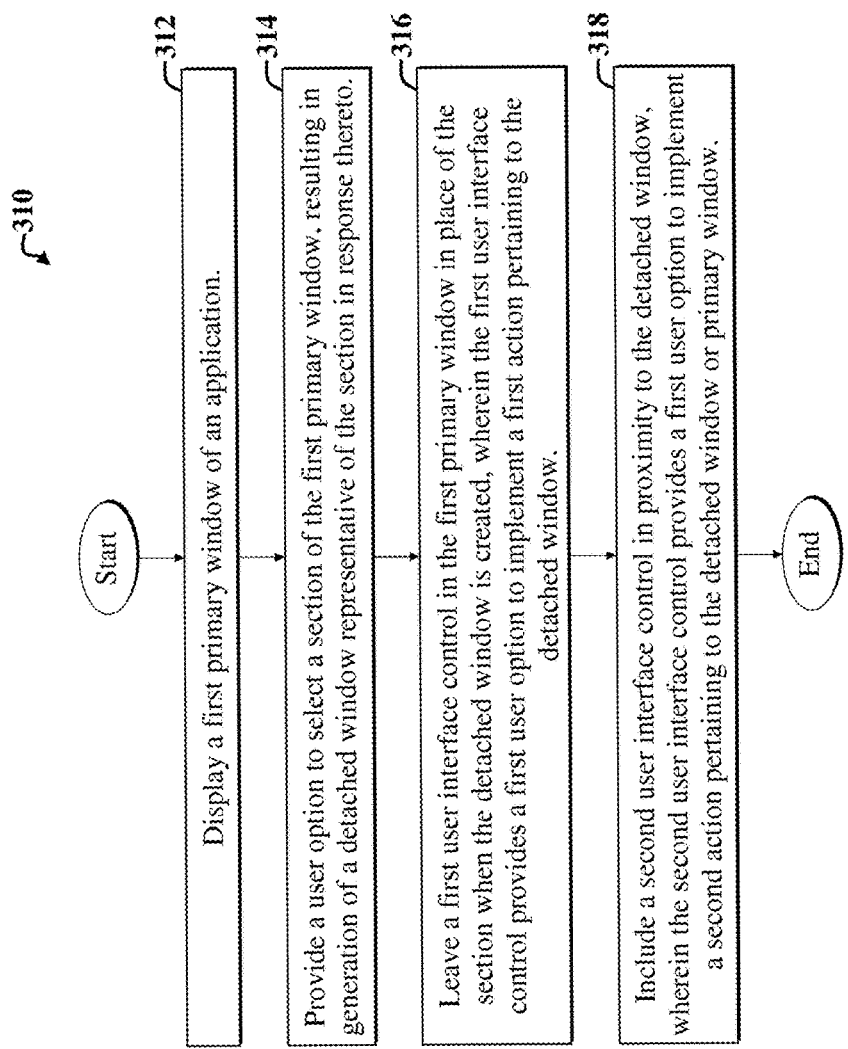
FIG. 13 is a flow diagram of an example method adapted for use with the embodiments of FIGS. 1-12.

FIG. 13 is a flow diagram of an example method 310 adapted for use with the embodiments of FIGS. 1-12. The example method 310 facilitates user interaction with a software application and includes a first step 312, which involves displaying a first primary window of an application.

A second step 314 includes providing a user option to select a section of the first primary window, resulting in generation of a detached window representative of the section in response thereto.

A third step 316 includes leaving a first user interface control (such as an attachment/detachment control, a drop-down menu button, etc., in a ghost header) in the first primary window in place of the section in response to generation of the detached window, wherein the first user interface control provides a first user option to implement a first action pertaining to the detached window. The first action may include, for example, returning a detached window to the first primary window, sticking a detached window, and so on.

A fourth step 318 includes providing a second user interface control in proximity to the detached window, such as in a window header and/or page header of the detached window. The second user interface control provides a first user option to implement a second action. The second action may include, for example, bringing a detached window forward in front of other windows, resetting a window layout, i.e., window arrangement, sticking, and grouping configuration, and so on.

Note that the method 310 may be augmented with additional steps; steps may be rearranged, and certain steps may be omitted, without departing from the scope of the present teachings. For example, the method 310 may further include a step that includes providing one or more user options for enabling a user to create and store window layouts, which may include information pertaining to detached windows, stuck windows, grouped windows, data associated with each window, and so on. Layouts may be remembered across sessions; may be restored and applied to a given application session; may be transferred to and reused on different computing devices, and so on. A user option for storing multiple window layouts can be provided, so that if a user accesses an application from a different computing device, e.g., a home personal computer versus a mobile or work-based computing device, the user may activate one or more pre-stored window layout configurations.

Figure 14:
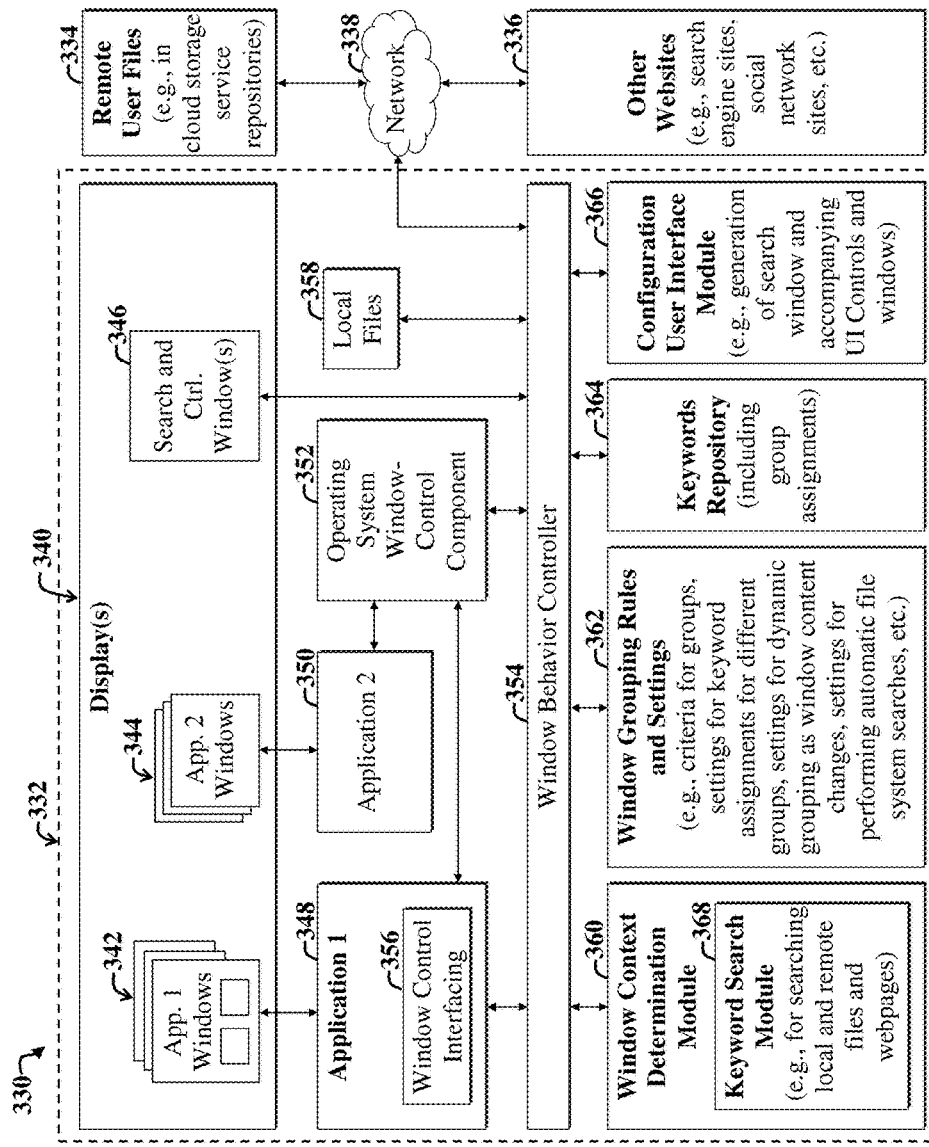
FIG. 14 is a diagram illustrating a second example system for facilitating user management of windows, data, and functionality and which is adapted to detect window content of windows of one or more software applications and to adjust window behaviors in response thereto.

FIG. 14 is a diagram illustrating a second example system 330 for facilitating user management of windows, data, and functionality. The system 330 is adapted to detect content of windows 342-346 of one or more software applications 348, 350, 354-368 and to adjust window behaviors in response thereto. The example system 330 includes an example computer system 332 in communication with remote user files 334 and websites 336 via a network 338, such as the Internet.

The example computer system 332 includes one or more displays 340 suitable for displaying application windows 342-346 generated by software applications 348, 350, 354-368 running on the computer system 332. The example windows 342-346 include a first set of application windows 342, a second set of application windows 344, and a search window 346, which are generated via a first application 348, a second application 350, and window behavior software 354-368, respectively.

The window behavior software 354-368 includes a window behavior controller 354 in communication with a window context determination module 360, a window grouping rules and settings module 362, a keywords repository 364, and a configuration user interface module 366. The window context determination module 360 includes a keyword search module 368. The window behavior controller 354 includes computer code for coordinating communications between various modules 360-368 of the window behavior software 354-368 and for selectively controlling behaviors of the displayed windows 342-346 in accordance with keyword-based window groupings, via interfaces 352, 356 to applications 348, 350 running on the computer system 332.

The window behavior controller 354 may interface with the applications 348, 350, via a window control interfacing add-on module 356 of the first application 348 and/or via an operating system window-control component 352. The window behavior controller 354 further includes computer code for facilitating coordinating communications between keyword search functions of the window context determination module 360 and local files 358, remote user files 334, and various websites 336, to enable searches for content based on keywords entered via one or more search and control windows 346.

Note that window context information may be derived from window content, such as keywords and/or via other information, such as information identifying what application spawned a given window; whether the window was spawned from a search window while a particular window group was open; information pertaining to data maintained in a database object used to generate a window or provide window functionality, and so on.

For the purposes of the present discussion, window context may be any information associated with or otherwise characterizing a window, including, but not limited to, information about how a window was originated (e.g., via which software application), what other windows are being displayed simultaneously, and window content.

Window content information may refer to a particular subject matter associated with the window or accompanying content. For example, a window of a database application that displays data pertaining to a sales lead object may exhibit sales lead content. That data may include keywords, which have been associated with the sales lead content. Such keyword associations may facilitate window grouping, as discussed more fully below.

For the purposes of the present discussion, a keyword may be any word or phrase that is associated with a window group or otherwise identifies or is representative of a context or content of a window or document.

Note that in certain scenarios, window content may refer to a topic or subject of data within the window and/or may refer to a topic or subject of data included in a database object and/or application with which the window is associated. For example, if a database object associated with a business contact is accessed by a mapping application that shows an address or location, the associated window may not necessarily include keywords that directly relate to the business contact. Nevertheless, the window that displays a map showing an address of the business contact may exhibit business contact content information, by virtue of the fact that the map window accesses the database object associated with the business contact.

The window context determination module 360 includes computer code for facilitating determining and tracking window context for various displayed windows 342-346. The accompanying keyword search module 368 includes computer code that is adapted to facilitate implementing searches of local files 358, remote user files 334, websites 336, and open windows 342-346 for keywords, which are associated with window groups.

The window grouping rules and settings module 364 includes computer code for maintaining rules and settings that govern how windows are to be grouped, including settings for keyword assignments (e.g., dynamic or manual), group creation (e.g., dynamic or manual); settings for performing automatic file system searches; settings for governing how windows of a window group behave when a grouped window is selected or comes into focus (e.g., whether all windows of a group come forward; whether one group has a higher priority than another group when a selected window belongs to multiple groups, and so on); setting for determining whether a child window spawned from a parent window is automatically assigned to the group of the parent window, and so on, as discussed more fully below.

The keywords repository 364 may be implemented as a database that maintains a collection of keywords and assignments or mappings between keywords and window groups. Such settings represent a type of window grouping rules.

Note that keywords and associated window groups may change, including dynamically and/or manually, depending upon settings maintained via the window grouping rules and settings module 364. For example, in certain embodiments, keywords and window groups may be automatically determined via the software 354-368 based on window context. Note that the window context determination module 360 may selectively access the keywords repository 364 via the window behavior controller 354 to facilitate determining window context.

For the purposes of the present discussion, dynamic grouping may be any process involving automatic grouping of application windows. For example, if a window group of a particular window automatically changes when keywords included in window content or context changes, the window is said to be dynamically grouped.

The configuration user interface module 366 includes computer code for generating user interface controls and associated functionality, which may be user accessible via one or more search and control windows 346, as discussed more fully below. The user interface controls accessible via the one or more search and control windows 346 may include controls for entering keyword searches of file systems; accessing user options for managing window group behaviors and settings; enabling automatic web searches for content related to a context of a currently in focus and open window group, adjusting various rules and settings of the window grouping rules and settings module 362, and so on.

For the purposes of the present discussion, an open window group may be any window group that is associated with a currently open window. The open window is said to be a member of the open window group.

A search and control window 346 may be considered as a type of control window. For the purposes of the present discussion, a control window may be any window with one or more user interface controls for affecting behaviors of open windows presented via a computer display.

A window behavior may be any window characteristic pertaining to how a window acts, such as when the window is in focus; when a window of a window group is in focus; when a window is stuck, and so on. For example, if a grouped window is selected, and other windows of the same window group come forward in front of other windows on a display, the behavior of the grouped windows is said to be affected by the window groupings. The behavior represents a characteristic of a grouped window.

In an example scenario, the various application windows 342-346 are grouped in accordance with window context, which is associated with keywords. Each window group is associated with a set of keywords that can be manually established (e.g., via one or more user interface controls of the one or more search and control windows 346) or automatically established (e.g., via the window context determination module 360 with reference to the window grouping rules and settings 362 and keywords repository 364). The one or more search and control windows 346 belong(s) to all window groups, i.e., exhibit global group membership.

In the present example scenario, a call center employee (user) is working to assist different customers, where each sales client is assigned a window group, and where keywords used for window groupings include client name and keywords, such as "customer." The first set of application windows 342 may be spawned from or generated via a mapping application corresponding to the first application 348. The second set of application windows 344 may be spawned from a database application corresponding to the second application 350.

In the present scenario, a user may select a grouped window from among the second set of windows 344, which causes relevant windows of the same window group, including any appropriately grouped windows of the first set of application windows 342, to move forward in front of other windows that are not part of the selected in-focus window group, in accordance with window group behavior rules, (e.g., as maintained via the window grouping rules and settings module 364). The search and control window 346 may remain the topmost window.

The selected window, i.e., the in-focus window, of the second set of application windows 344 is associated with a window group, which is associated with a set of keywords related to the context of the selected in-focus window. Such keywords may be automatically entered into a search field of the search and control window 346, e.g., via the window behavior controller 354, thereby triggering an automatic search of local files 358, remote user files 334, and websites 336. The search results may represent documents, that when opened, would belong to the currently open window group, i.e., the group associated with the in-focus application window.

Note that such automatic searching based on keywords may be disabled, e.g., via one or more user interface controls of the search and control window 346 based on instructions and associated computer code maintained via the configuration user interface module 366. Furthermore, settings for limiting the scope of searches, e.g., limiting searches to local files only 358, remote user files 344, and so on, may be user adjusted.

In the present scenario, a user switches focus from the originally selected window of the second set of application windows 344 to the search and control window 346 and then manually overwrites the automatically entered keyword search criteria with one or more other keywords. The window behavior controller 354 then employs the keyword search module 368 to implement a new search based on the newly entered keywords. Resulting found files, including any documents, web page links, and so on, may then be displayed in the search and control window 346.

User selection or activation of a search result, e.g., the opening of a file from the search and control window 346, may result in display of another window spawned from the search and control window 346. The resulting spawned window may represent a child of the search and control window 346. The spawned window may inherit the window group of the most recent open window group, i.e., the window group associated with the previously in-focus window of the second set of application windows 344.

Note that behaviors of different windows, such as the moving of windows of selected window groups forward in front of other windows, may be effectuated via signaling from the window behavior controller 354 to the operating system window-control component 352, and from the operating system window-control component 352 to the application 350. Note that details of computer code for enabling such control is implementation specific, but those skilled in the art with access to the present teachings may readily implement such functionality without undue experimentation. Furthermore, such window behavior control may be effectuated via an add-on module, such as the window control interfacing module 356, installed as part of the software application 348.

Hence, window content may drive keywords; keywords may define window groups; and keywords may be window search criteria for uncovering other related content. Windows can belong to multiple groups, and windows can also be sub-groups of other groups and may be members of multiple groups. Details of window behaviors when grouped in multiple groups or when sharing sub-groups of different groups are implementation specific and may vary depending upon the needs of a given implementation.

Window groupings may change dynamically when different windows are selected, i.e., when a user switches from working in one context to another. Furthermore, window groups may be automatically created. For example, content of a particular window may be modified, and the underlying system may determine a new set of keywords; then create a new window group based on those keywords. Dynamic group creation and switching of group memberships may be tuned to a given computing environment to facilitate efficient user access to sought content and functionality.

Hence, the context determination module 360 is adapted to access a set of rules (e.g., window grouping criteria, settings, and other rules) such as keywords 364, which are to be associated with certain window groups. User interface controls, e.g., as provided via the search and control window 346, may facilitate user control over the rules, including user control over keywords and group assignments, automatic window grouping criteria, and so on. For example, a user may employ a user interface control in the search and control window 346 to toggle automatic window grouping based on automatically detected contextual keywords, as discussed more fully below.

The window behavior controller 354 and certain modules 356, 352, 360 with which it communicates include computer code for facilitating monitoring text in open windows, and automatically or manually forming window groups in accordance with the window grouping rules and settings 362.

Interfacing modules, including the window behavior controller 354, the window control interfacing module 356, and operating system window-control component 352, are adapted to facilitate interfacing the window behavior software 354-368 with the accompanying computer operating system to selectively bring windows forward or send them backward in accordance with window groupings. In general, interfacing modules can be incorporated into each running software application 348, 350 (e.g., via plug-ins or mechanisms implemented via Object Linking and Embedding (OLE)), as needed depending upon requirements of a particular implementation.

Note that in certain implementations, the window behavior controller 354 and window context determination module 360 may include software for monitoring screen captures of open windows to determine existing window context and groupings. Screen captured windows may be passed through Optical Character Recognition (OCR) software to facilitate determining keywords and application information occurring in the captured image information.

Instead of or in addition to monitoring text in open windows, e.g., via screen capture techniques, other implementations, as detailed above, involve employing one or more modules to interface with the programs themselves and/or the operating system.

The search and control window 346 may include additional options for displaying lists of current window groups; lists of all open windows; lists of running programs and sub-processes, and so on. User options for selectively grouping windows and controlling window group memberships and/or sticking windows of open windows may be provided via one or more user interface controls in the search and control window 346.

Note that implementations are not limited to client-side implementations. For example, a version of the second example system 330 may be implemented by moving functionality of various modules, e.g., modules 360-368 to one or more web services. In such implementations, the applications 348, 350 may be adapted to communicate with the one or more web services to facilitate window behavior functionality discussed herein, e.g., to facilitate coordinating data and windows being managed by each software application.

Furthermore, implementations of the search and control window 346 functionality are not limited to directly searching file and webpage content. For example, files of a given system may be tagged with group metadata, where each tag associates the file or webpage with keywords. Accordingly, when a search is performed, the keyword search module 368 may limit searches to the metadata tags associated with each file, thereby potentially improving search algorithm performance.

In such an implementation, keywords may be weighted for inclusion in a metadata tag based on where the keyword occurs in a file or document (e.g., title of document, formatting header) and/or a number of instances of occurrence of the keyword in the file or document. When a file or document with keyword is opened, the associated window may be grouped in accordance with the keywords in the opened file or document and included in the associated metadata data tag and further in accordance with weights assigned to each keyword or set of keywords or phrases.

In summary, use of keywords to specify and perform window groupings facilitates providing additional functionality, e.g., as enabled in part via a search and control window 346. The search and control window 346 facilities user access to functionality for changing window groups based on search results; changing of search results based on different window group selection (where selection of a group may be performed by user selection of a window of the group); automatically retrieving of web search results based on keywords associated with a selected window group; dynamically updating window groupings based on changes to content of a window that is part of a particular group; automatically determining window groupings (including sub-groups and overlapping window groups, where a given window can belong to multiple window groups and/or sub-groups) based on window context, and so on. For the purposes of the present discussion, a sub-group may be any window group that is part of another window group.

Note that when a window group is in focus, the underlying system (including modules 354-368) may facilitate implementing a search of the accompanying file system (e.g., local files 358), remote user files 334, and web content 336 for files and/or other content that contain keywords of the group.

The search results may be updated when user switches context. Furthermore, window groupings may also update when the user switches context, such as when another window group is brought into focus, or when context is switched within a group (e.g., when keywords associated with a group are changed); and when the content of a window changes.

Figure 15:
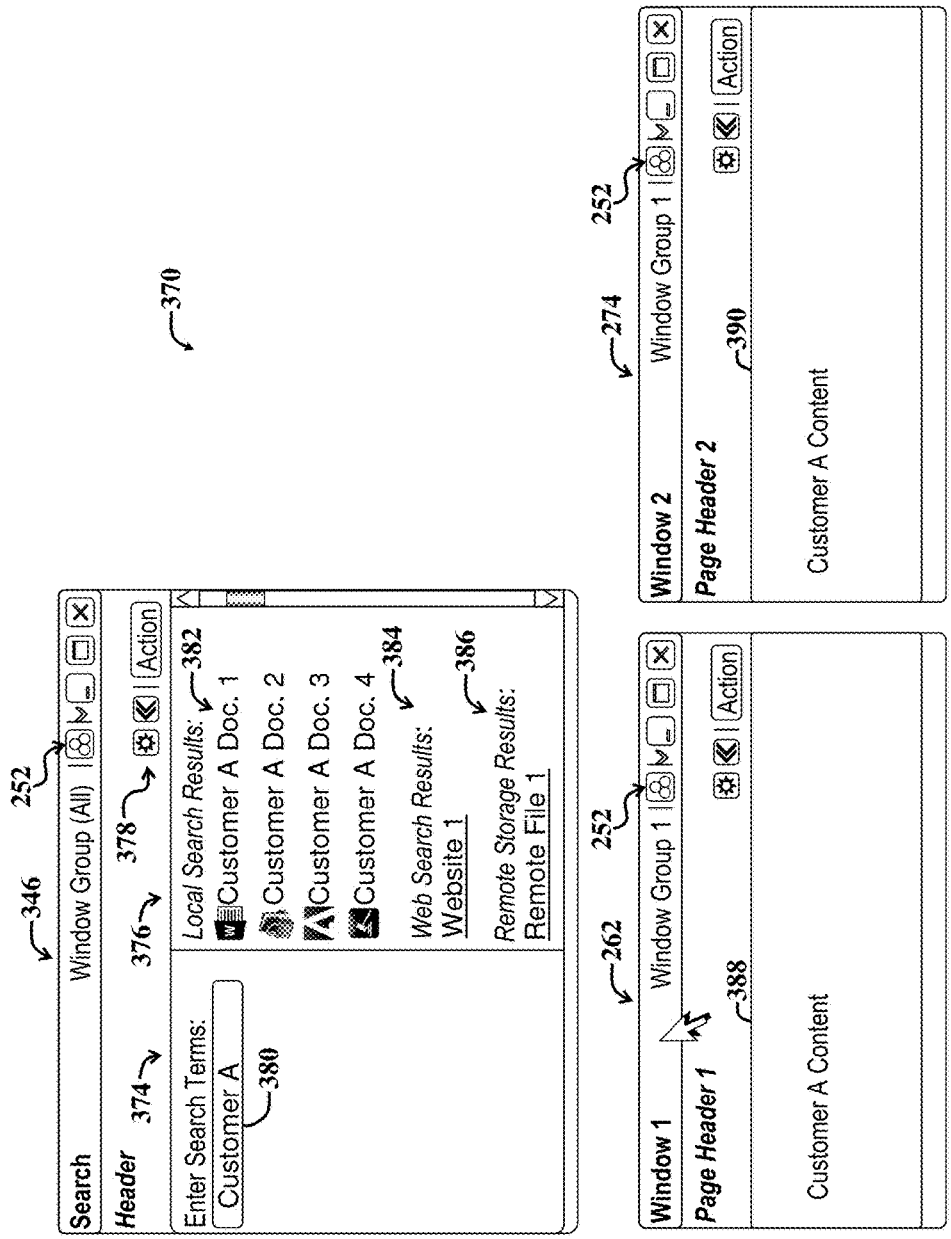
FIG. 15 shows an eighth example set of user interface display screens adapted for use with the system of FIG. 14 and illustrating interaction of window behaviors and accompanying groupings with search results.

FIG. 15 shows an eighth example set of user interface display screens 370 adapted for use with the system 330 of FIG. 14 and illustrating interaction of window behaviors and accompanying groupings with search results 376. The user interface display screens 370 include an example search and control window 346 (also simply called the search window 346) whose behavior and functionality may affect and/or be affected by other windows 262, 274, and accompanying content.

In the present example embodiment, the search window 346 is part of all window groups of windows presented on a display, and is shown as grouped, e.g., via the group status icon 252. Note that the group status icon 252 may be replaced with another group status icon that indicates additional information. For example, in certain implementations, a group status icon may be selectively adjusted to indicate that the search window 346 is globally grouped, i.e., associated with a group that includes all open window groups. Furthermore, group status icons may change to illustrate when a given window is a sub-group and/or is a member of multiple groups and/or sub-groups.

The search window 346 includes a search section or panel 374 with a search field 380 for entering search terms. Note that search terms entered in the search field 380, either manually or automatically, represent keywords to the extent that they may affect window groups through functionality associated with the search window 346, as discussed more fully below.

The search window 346 further includes a search results section 376, including any local search results 382, web search results 384 (e.g., hyperlinks), and remote storage search results 386. The local search results 382 may represent documents or files found on the computer system 332 of FIG. 14. The web search results 384 may include found hyperlinks matching the search query (e.g., "Customer A" entered in the search field 380). The remote storage search results 386 may represent results of a search of a remote data storage repository, such as may be provided via a cloud backup service.

For the purposes of the present discussion, a cloud service may be any mechanism for enabling a user to store files at a remote location, such as a database or file system maintained via a server coupled to the Internet. For example, various web-based computer data backup services are considered cloud services for the purposes of the present discussion.

Note that the search window 346 and underlying functionality may leverage existing search engines to facilitate providing the search results 376. For example, to produce the web search results 384, a script for accessing a web-based search engine, such as Google or Bing, and retrieving the search results for inclusion in the search window 346, may be employed to produce the web search results 384.

The search window 346 includes various header controls 378, which may be associated with drop-down menus and/or other functionality for facilitating controlling grouped windows; window grouping behaviors and settings, including content displayed in the search window 346; behaviors of functionality associated with the search window 346, and so on, as discussed more fully below.

In a first example scenario, a user has selected the first window 262, which becomes the in-focus window. The first window 262 is associated with a first window group, as is the second window 274. The first window 262 and second window 274 are predominately displayed upon user selection of the first window 262. One or more keywords, e.g., "Customer A," of the first window 262, reflect window context, i.e., window content maintained in a first window content section 388. The one or more keywords are also associated with or assigned to the first window group and facilitate defining the first window group.

Accordingly, upon user selection of the first window 262, the search field 380 of the search window 346 is automatically populated with keywords pertaining to the first window group of the selected first window 262. Various search results 376 are then automatically displayed in the search results section 376 of the search and control window 346. If a user opens a document pertaining to a search result 382-386 from the search and control window 346, the resulting window used to display the document content automatically becomes part of the existing window group, i.e., window group 1.

Hence, the user now has efficient access to local documents 382, websites and/or web pages 384, and remote documents 386 that relate to the current window context, which is associated with the one or more keywords that are associated with the window group (i.e., first window group) of the first window 262 that is currently in focus.

In a second example scenario, a user manually enters one or more keywords (e.g., "Customer A") in the search field 380 to automatically trigger a query that produces the search results 382-386 shown in the search results section 376. Simultaneously, any open windows of window groups associated with the entered keyword(s) become more prominently displayed, i.e., moved in front of other windows on a display. Note that such features and behaviors may be selectively enabled or disabled by a user, as discussed more fully below.

When a user selects and opens a search result from the search result section 376, a new window is spawned. The newly spawned window may then automatically become a member of the window group characterized by the keyword(s) entered in the search field 380, depending upon user configurable settings.

Alternatively, depending upon underlying system settings (which may be user configurable) when a user manually enters one or more keywords in the search field 380, the previously selected window group remains prominent. For example, the first window group of the first window 262 may remain the selected window group.

In this case, when a user enters one or more keywords in the search field 380, the entered keywords are not necessarily associated with the first window group, and hence, may yield search results that are not necessarily initially associated with the first window group. However, if a user spawns a window by opening a search result from the search results section 376, then the opened window may automatically become part of the first window group. Furthermore, the keyword(s) entered in the search field 380 may then be assigned as keywords to be included among the keywords defining the first window group, even if such entered keyword(s) were not originally part of any window group keyword assignments.

Figure 16:
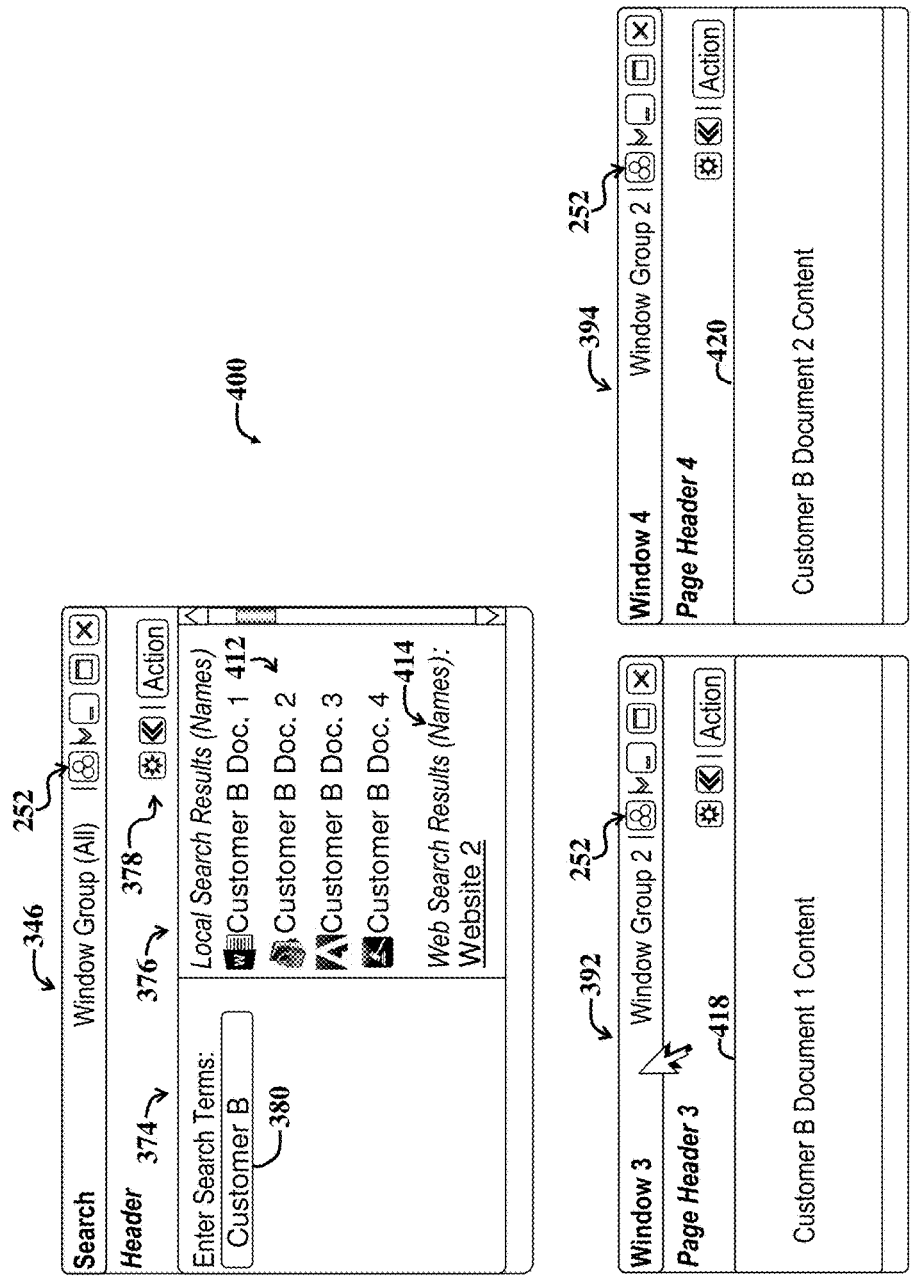
FIG. 16 shows a ninth example set of user interface display screens after a different search term has been entered into a search field of a search window of FIG. 15.

FIG. 16 shows a ninth example set of user interface display screens 400 after a different search term (i.e., keywords "Customer B") has been entered into a search field 380 of a search and control window 346 of FIG. 15. In the present example scenario, a user has entered "Customer B" as a keyword search term in the search field 380, resulting in display of search results 412-414 being updated in the search section 376 of the search and control window 346. Alternatively, a user has selected a window, e.g., a third window 392 that is associated with a window group characterized by the keywords "Customer B."

Furthermore, windows of a window group associated with the keywords "Customer B" are brought forward in accordance with window group behaviors associated with a second window group to which the associated third window 392 and fourth window 394 belong. Note that the third window 392 includes third window content 418, which includes the keywords "Customer B." Similarly, the fourth window 394 includes third window content 420, which includes the keywords "Customer B." Both the third window 392 and the fourth window 394 are part of the second window group (Window Group 2) as indicated in their respective headers. Accordingly, the second window group is associated with the keywords "Customer B."

Note that additional keywords, e.g., other than "Customer B" may be associated with the second window group. In general, any window group may have one or more keywords or phrases that are associated therewith and used to group windows therewith.

Accordingly, the search and control window 346 may exhibit user configurable functionality and behaviors, as implemented via underlying software, including, but not limited to:

1) When a window is launched from another window, it may inherit the group settings of the parent window.

2) The search and control window 346 may belong to all active window groups, i.e., window groups associated with one or more open windows. The search results 382-386 illustrated in the search and control window 346 may change when a user brings a different window group into focus. Any windows that are spawned from opening a search result may belong to the window group in focus.

3) The underlying system may automatically search the file system (local and remote) for files that contain the same keywords that define the window group that the user is currently using (i.e., in-focus window group, which may be any window group of which an in-focus or selected window is a member).

4) The search results 382-386 may be updated as the user switches context, e.g., by bringing another window group into focus or by switching the context within a group affecting the set of keywords that defines it, such as by modifying window content.

5) The underlying system may use keywords that define or that are otherwise associated with an in-focus window group to query networks, such as the Web and possibly social media articles related to an in-focus window group.

6) When a user opens an application window without spawning it from another window, the underlying system may, depending upon user-configurable settings, automatically detect any existing keywords in the new window and automatically assign a group to the window.

7) User options enable a user to change various window group behavior settings and to manually change a window group assignment.

8) The underlying system may automatically detect keywords in an open application window and create and/or assign one or more window groups to the open application window accordingly. In this sense, content of a document represented via an open window may act as a search field for searching for groups for which to assign the document.

9) The underlying system may support manual assignment or definition of a window group, and the underlying system may subsequently automatically detect occurrences of the keywords defining the group in other open windows. A user may contribute keywords to a set of keywords associated with or defining a window group.

10) Depending upon user-configurable settings, changes to window content may effect an automatic change of the window group associated with or assigned to the open window.

Figure 17:
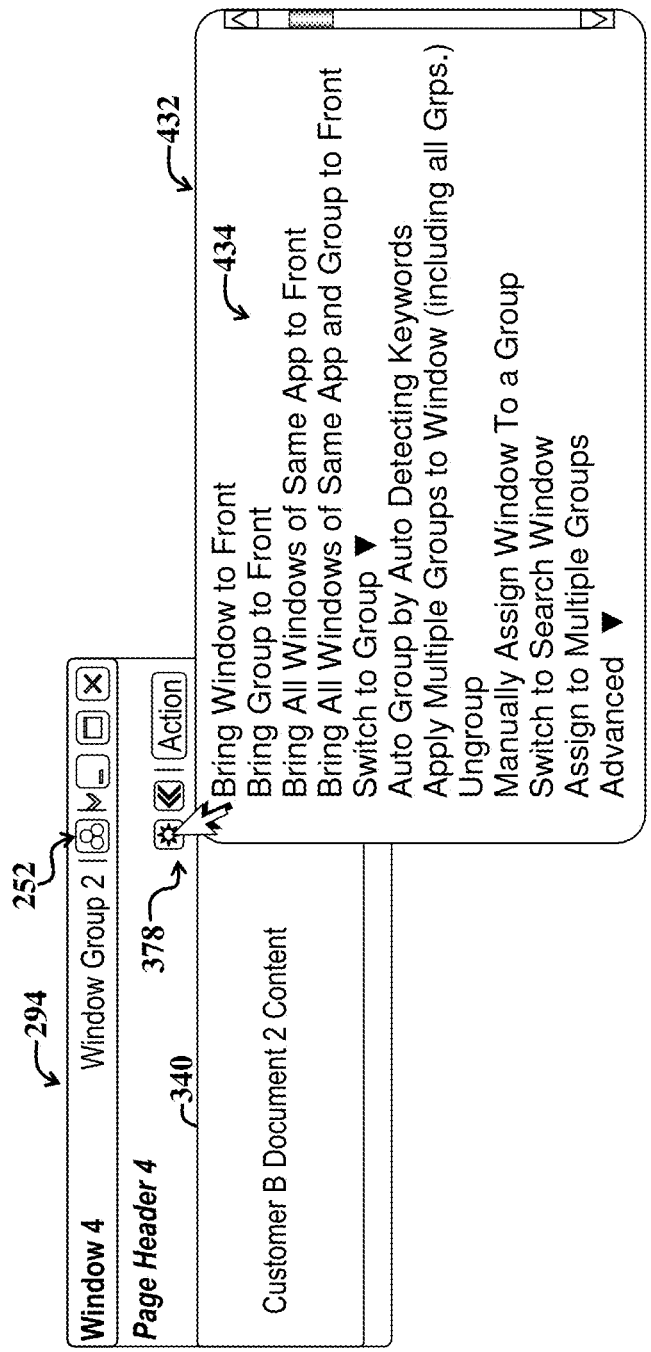
FIG. 17 illustrates an example user interface display screen shown in FIG. 16 after activation of a drop-down menu thereof and illustrating various user options for affecting a window and associated window group and behaviors.

FIG. 17 illustrates an example user interface display screen corresponding to the fourth window 294 shown in FIG. 16 after activation of a drop-down menu 432 thereof and illustrating various example user options 434 for affecting a window and associated window group and behaviors.

The example drop-down menu 432 may be activated via one or more user interface controls 378 of the window header (i.e., page header 4). The example user options 434 include user options for bringing a window in front of other windows; bringing a group of windows associated with the window 294 in front of other windows of other window groups; bringing all windows of a similar application (i.e., the same application used to generate the fourth window 294) in front of other windows; bringing all windows of the same application and window group forward in front of other windows; switching focus to a different available window group (from a sub-drop-down menu); automatically grouping words by automatically detecting keywords in the fourth window 294; applying multiple window groups to the group associated with the fourth window 294; ungrouping the fourth window 294; manually assigning the window group associated with the fourth window 294 to another window group; switching focus to the search and control window 346 of FIG. 16; assigning the fourth window 294 to multiple groups; selecting from various additional advanced options (e.g., via another sub-drop-down menu), and so on.

Note that user selection of any of the user options 434 may trigger display of one or more additional windows, with additional fields and controls for adjusting settings. For example, user selection of the "Apply Multiple Groups to Window" user option may spawn a window with user interface controls for facilitating selecting plural window groups to assign to the currently in-focus window 294.

Note that the drop-down menu 432 is illustrative and may vary, without departing from the scope of the present teachings. Furthermore, note that a similar drop-down menu may also be activated from the search results section 376 of the search and control window 346 of FIGS. 15-16, such as via a right-clicking on one or more of the accompanying search results.

Furthermore, note that the search window 346 of FIGS. 15 and 16 may be augmented with additional sections or panels, such as a panel showing all open windows, a panel showing all open groups, and so on. A panel showing a list of open windows may act as a panel of ghost headers, with accompanying user interface controls for controlling window behaviors and group behaviors.

Note that in certain implementations may involve software applications that are adapted to open multiple windows (e.g., tabs) within a parent window (e.g., a browser screen). In such cases, user options for applying multiple window groups to the same window and for setting windows to be members of all window groups or no window groups may be provided.

In general, window group assignments may be dynamic, and the group membership can change as the user manipulates or changes the content. However, some changes to content within a window may affect its context and window assignment while other changes may not necessarily cause a change in window group assignment, i.e., window group membership.

Note that certain window groups may be hierarchical, such that they contain nested groups, e.g., sub-groups of sub-groups of groups. For example, a given set of windows spawned from the same application may all be part of a window group, which itself may be a sub-group of another group, and individual spawned windows of the same application may belong to different sub-groups.

Figure 18:
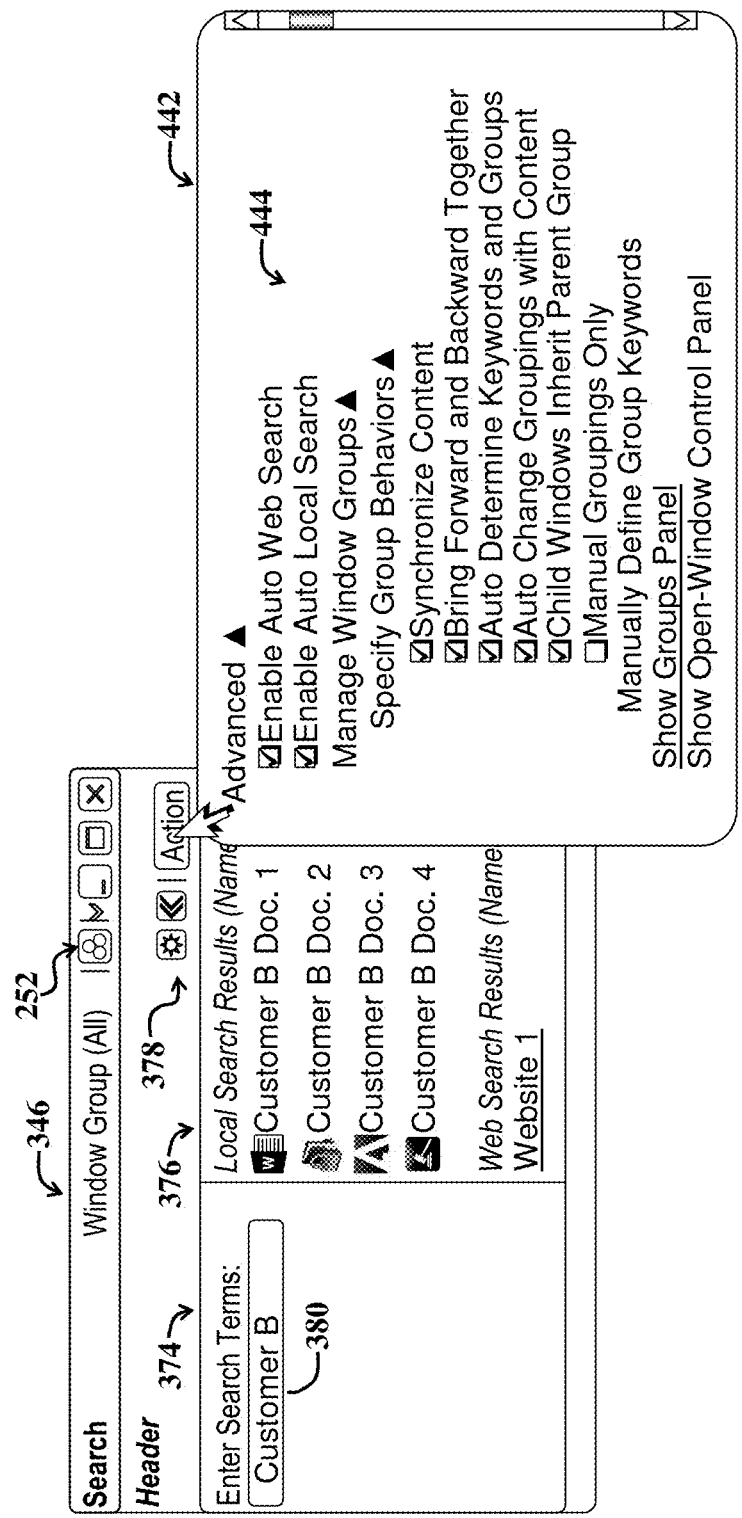
FIG. 18 illustrates an example search window and an accompanying drop-down menu with various user options for configuring system rules and associated behaviors and features, including features of the search window.

FIG. 18 illustrates an example search window 346 and an accompanying drop-down menu 442 with various user options 444 for configuring system rules and associated behaviors and features, including features of the search window 346.

The example user options 444 include a set of advanced options, including an option to enable automatic web searches; an option to enable automatic local file system searches; a set of options to manage window groups, including a set of options to manage specific group behaviors; and a user option to manually define keywords for one or more window groups.

The set of options to manage specific group behaviors includes a user option to synchronize content; a user option to bring forward and backward grouped windows together; a user option to automatically determine keywords and window groups; a user option to cause child windows to automatically inherit the group of the parent window; and a user option to enable manual window groupings only.

The set of advanced options further includes a user option to show a window group panel or section in the search window 346, and a user option to show a list of open windows and their groupings, along with user interface controls for controlling the open windows, i.e., a user option to show an open-window control panel.

Note that the user options 444 of the drop-down menu 442 may merely represent a portion of user options available from the menu 442. For example, other user options may be uncovered by scrolling the menu 442. If the menu 442 is scrolled up, user options similar to the user options shown in the first drop-down menu 432 of FIG. 17 may appear.

In the present example scenario, the user option to automatically change window groupings with content is shown as selected. Accordingly, when the user opens an application window, e.g., with or without spawning it from another window, the underlying system may automatically detect any existing keywords in the newly spawned window and then automatically assign a group (and/or one or more additional groups) to the spawned window.

If the user selects the "Manually Define Group Keywords" option, then another window may appear with user interface controls for enabling a user to manually assign (as opposed to automatic system-determined assignments) and/or define window groups and for adding and/or removing keywords from window group specifications, i.e., definitions. Note that in certain implementations, such functionality may also (or instead) be accessed via window header user interface controls and menus, e.g., as discussed above with reference to FIGS. 7-9.

Figure 19:
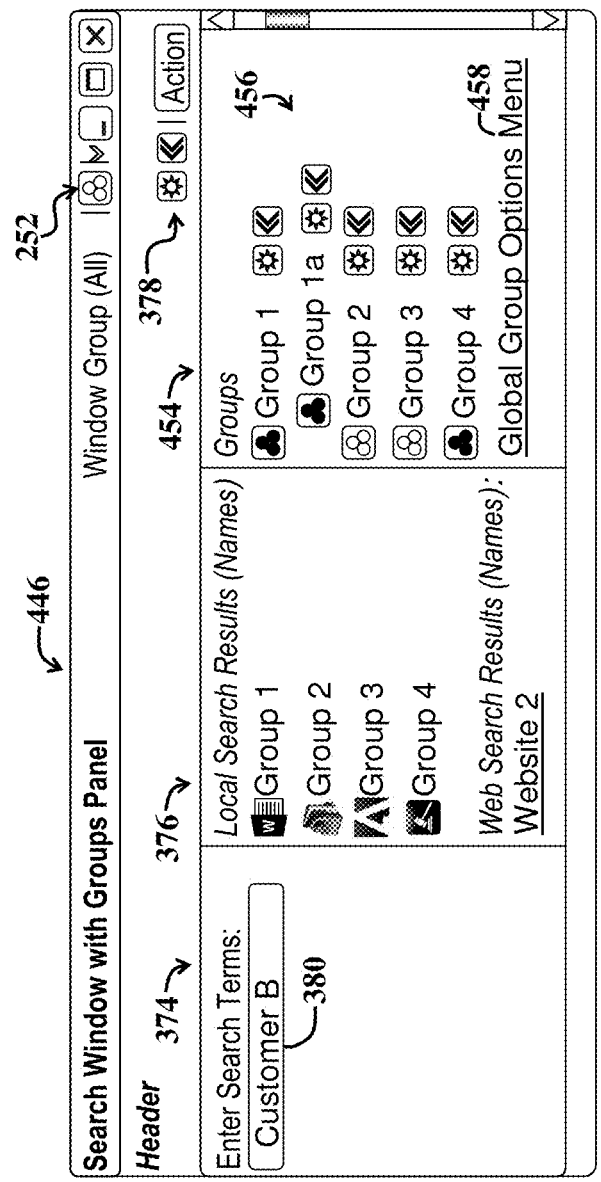
FIG. 19 illustrates an example search window corresponding to the search window of FIG. 18 after a groups panel has been activated.

FIG. 19 illustrates an example search window 446 corresponding to the search window 346 of FIG. 18 after a groups panel 454 has been activated, e.g., in response to user selection of a "Show Groups Panel" user option from the second drop-down menu shown in FIG. 18.

The groups panel 454 includes a listing of open window groups 456 (and/or all window groups, depending upon the implementation) with accompanying user interface controls and group status indicators (e.g., indicating whether the associated group is stuck or unstuck). The groups panel 454 further includes a link to a global group options menu 458, which may provide various user options for affecting global system behaviors, i.e., settings and rules that apply to all window groups and accompanying windows. For example, the link 458 may provide user access to a user option for specifying that windows of a selected window group will come forward in front of other windows but will be sorted in accordance with numbers of instances of group keywords occurring in the window content.

Figure 20:
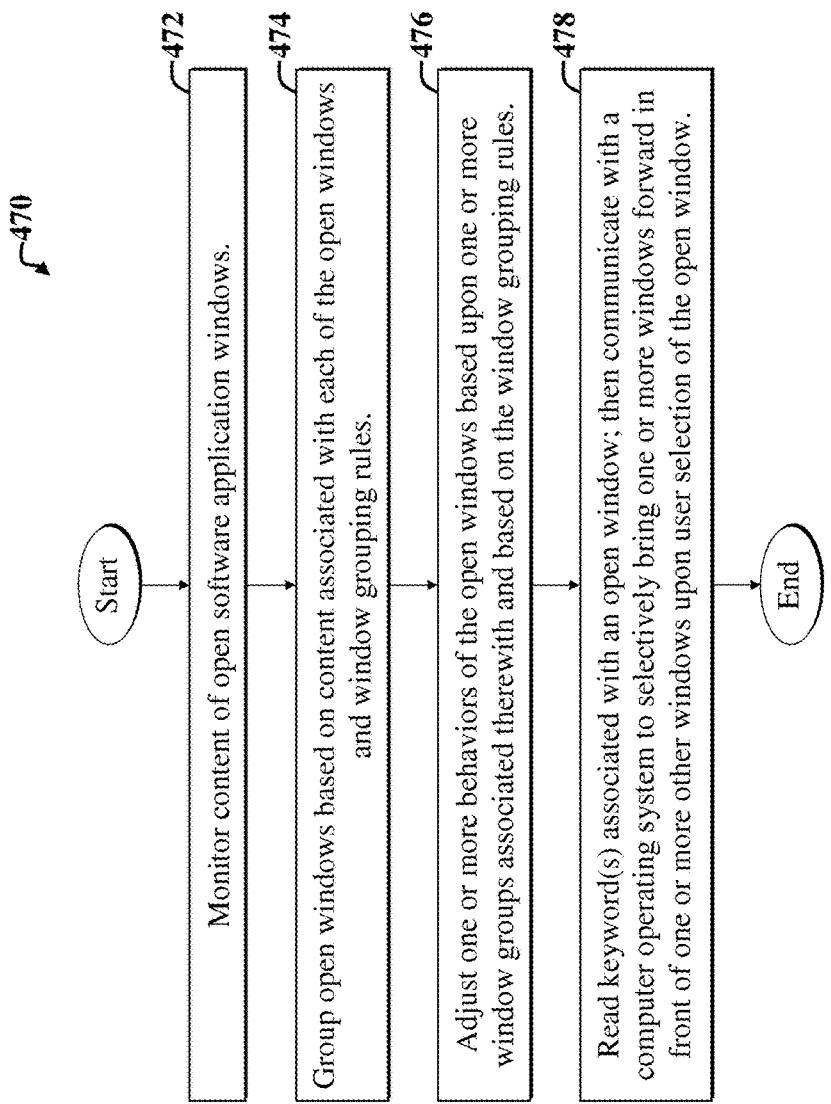
FIG. 20 is a flow diagram of a second example method adapted for use with the embodiments of FIGS. 14-19.

FIG. 20 is a flow diagram of a second example method 470 adapted for use with the embodiments of FIGS. 14-19. The example method 470 facilitates managing one or more windows and associated behaviors. The example method 470 includes a first step 472, which involves monitoring content of open windows.

A second step 474 includes grouping open windows based on content, e.g., as represented via keywords, associated with each of the open windows and window grouping rules.

A third step 476 includes adjusting behaviors of the open windows based upon one or more window groups associated with the open windows and in accordance with the window grouping rules.

The window grouping rules may include, for example, settings defining mappings between sets of keywords and corresponding window groups. Accordingly, the window grouping rules may include a specification that windows shall be grouped in accordance with keywords associated with each group and occurring in each open window. For the purposes of the present discussion a grouping rule may be any instruction or information specifying how windows should be grouped and/or how windows should behave.

As another example, the grouping rules may further include a rule specifying that application windows are to be dynamically grouped into one or more groups in accordance with content present in each application window.

Example grouping rules further include a rule specifying that window groupings automatically change with window content changes, wherein the content includes one or more keywords associated with one or more window groups.

A fourth step 478 includes reading content of open windows presented on a computer display; storing selected portions of read content (e.g., keywords); then communicating with an interface (e.g., a computer operating system or add-on application module) to a software application to selectively bring one or more windows forward in front of one or more other windows upon user selection of a window of the one or more open windows.

Note that the method 470 and accompanying steps 472-48 are illustrative and may be modified or augmented, without departing from the scope of the present teachings. For example, the one or more behaviors adjusted in the third step 476 may further include movement behaviors of open windows of a window group relative to other open windows in response to user selection of a window of the window group.

The example method 470 may further include using a search window to change window groups based on search results displayed in the search window; changing search results based on user selection of a window and further based on a group associated with the selected window; providing a user option to select a window group by selecting a window of the window group; automatically retrieving web search results based on one or more keywords associated with a selected window group; updating of window groupings based on changes to content of a window that is part of a particular window group; and automatically determining window groupings based on window context.

Another example method includes providing a user option to trigger a search of file content via search window and one or more keywords provided therein; determining when a window of a particular window group is in focus; automatically associating a file or document opened via the search window with the particular window group; and providing a user option to assign keywords and phrases to different window groups.

FIG. 21 is a flow diagram of a third example method 490 adapted for use with the embodiments of FIGS. 1-20. The example method 490 facilitates user control over behavior of application windows and includes an initial identification step 492, which involves identifying one or more open windows of plural software applications.

A subsequent rule-accessing step 492 includes accessing one or more rules pertaining to one or more behaviors or characteristics of the one or more of the open windows.

Next, a utilization step 496 includes using the one or more rules to adjust the one or more behaviors in accordance with a context of each of the one or more open windows.

Note that that the method 490 may be modified or augmented without departing from the scope of the present teachings. For example, the method 490 may further include providing a user option to adjust the one or more keywords, wherein the context includes the one or more keywords included in or associated with the one or more open windows.

The method 490 may further include displaying a search window with a user option to enter a query, wherein the query includes a keyword, and providing search results in response thereto, wherein the search results identify one or more documents, and further including associating the one or more documents with one or more window groups associated with the keyword.

While certain embodiments discussed herein employ keywords to define or identify window groups, i.e., to establish window grouping criteria, embodiments are not limited thereto. For example, certain implementations may employ other mechanisms for determining window context, e.g., windows can be grouped by application type, identities of database objects being accessed by applications and accompanying windows, and so on. For example, user options for assigning all Microsoft Word documents to a particular group and all browser windows into another group may be provided.

In addition, those skilled in the art will appreciate that certain embodiments discussed herein may enable various additional features. For example, in certain implementations different sets of software actions may be applied to specific windows, window groups, specific types of windows in a window group, and so on, where the sets of software actions (e.g., made available as user options) are tailored in accordance with window context.

Furthermore, while various embodiments discussed herein refer to a particular embodiment involving controlling windows, e.g., detached windows, parent windows, and so on, of a given software application via use of headers and ghost headers (and/or associated widgets or user interface controls), embodiments are not limited thereto.

For example, embodiments discussed herein may be adapted to facilitate control of multiple open windows of multiple different running applications. Such software for controlling multiple windows (e.g., by providing for sticking, grouping, and remote controlling abilities via a ghost header, detached window header, central user interface window management window, and so on) may be incorporated into a computer operating system; may be run as a client-side application running on top of an operating system but communicating with other open applications; or via other software architectures, such as server-side or distributed computing architectures.

Furthermore, embodiments that extend window control and data synchronization functionality across different types of software applications may facilitate providing various additional capabilities. For example, in certain implementations, client-side window-control software may be configured to cause automatic grouping of windows from different applications based on content existing in each open window. For example, if a user downloads a Portable Document File (PDF) containing given content; then cuts and pastes some or all of the content into a database file; and then cuts and pastes some or all of the content into a MicroSoft (MS) Word document, while keeping the PDF document, MS Word Document, and database window open, then the open windows may be automatically grouped.

The window control software may track content being transferred to and from a clipboard to different open windows of different applications to facilitate determining which windows to automatically group. Note however, that embodiments are not limited thereto. For example, mechanisms for attaching metadata to content to facilitate tracking content between open windows to determine window groupings may be employed. Alternatively, or in addition, a combination of screen capturing, content reading, and content comparing functionality may be employed to track content occurring in different application windows to adjust window behaviors accordingly.

Furthermore, the window control software may include instructions for generating user interface controls for enabling users to control window management behaviors (e.g., by enabling or disabling automatic window groupings), such as by configuring criteria for determining what types of content should trigger automatic window groupings, similarity thresholds between types of content, and so on.

Although the description has been described with respect to particular embodiments thereof, these particular embodiments are merely illustrative, and not restrictive. For example, while various embodiments discussed herein include mechanisms for grouping windows based on keywords, embodiments are not limited thereto. For example, embodiments that do not use keywords but other mechanisms for determining window content may be employed to facilitate window grouping operations, without departing from the scope of the present teachings. For example, the context of certain embodiments may be determined based upon which database object or document is being used by a particular window.

Furthermore, while certain embodiments discussed herein primarily refer to implementations involving one or more displays coupled to a single computer of device, embodiments are not limited thereto. For example, plural monitors used on different devices may be employed to implement embodiments discussed herein, so that windows may be dispersed across multiple monitors and devices, without departing from the scope of the present teachings.

Furthermore, configuration files may be employed to facilitate transferring or synchronizing window layouts and accompanying settings between devices. As devices become increasingly aware of the presence of other devices in their vicinity, applications will increasingly be able to function across devices. For that purpose, window management and grouping systems and methods discussed herein may greatly facilitate software user productivity, as users increasingly work across multiple portable and non-portable devices. For example, a sales agent returning to an office after a customer site meeting may return to the office; then use the office computer with a similar windows configuration as used for a mobile computing device that the agent brought to the customer site meeting. Accordingly, any work that the user began at the customer site on tablet or other mobile computing device may be further addressed on a desktop computer when the user returns to the office.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A method for facilitating user access to data and software functionality, the method comprising:

identifying one or more open windows of plural software applications, wherein the one or more open windows include a first open window and a second open window that are displayed simultaneously;

determining keywords associated with the one or more open windows by passing the one or more open windows through Optical Character Recognition (OCR) software;

accessing one or more rules pertaining to one or more behaviors or characteristics of the one or more open windows, wherein the one or more rules include at least one rule specifying that the one or more open windows shall be grouped into a window group in accordance with one or more keywords associated with the window group and occurring in each open window;

using the one or more rules to adjust the one or more behaviors in accordance with the one or more keywords, wherein corresponding data displayed in each open window of the window group is synchronized without synchronizing one or more second open windows of another window group;

dynamically updating which window grouping a particular window belongs to based on changes to content of the particular window;

detecting user selection of the first open window;

populating a search field of the second open window based on keywords pertaining to the first open window in response to the detecting of the user selection of the first open window; and performing a search of at least a backup service based on the keywords from the search field;

providing a user option to adjust the one or more keywords;

displaying a search window with a user option to enter a query, wherein the one or more keywords represent search criteria supplied in a search field of a search window, wherein the query includes a keyword of the one or more keywords, and providing search results in response to the query, wherein the search results identify one or more documents, and further including associating the one or more documents with one or more window groups associated with the keyword;

assigning a window displaying one or more of the documents to a window group associated with the keyword included in the query;

providing a user option to enable display of search results in the search window based on a user selected window, a window group associated with the user selected window, and one or more keywords associated with the window group;

adjusting the one or more behaviors by grouping the one or more open windows in accordance with the one or more rules;

providing a user option to adjust the one or more rules, wherein the one or more rules includes a rule specifying that application windows are to be dynamically grouped into one or more window groups in accordance with content present in each application window, wherein the one or more window groups include one or more sub-groups, wherein the one or more rules include a rule specifying that windows shall be grouped in accordance with one or more keywords associated with each window group and occurring in each of the one or more open windows, and further including changing a window group when content of one of the windows in window group changes, and wherein the content includes one or more keywords associated with one or more window groups;

assigning a window to plural window groups when the window meets grouping criteria for different window groups;

grouping one or more window groups in accordance with an application from which the one or more window groups were spawned;

providing a user option to control behaviors of the one or more open windows in accordance with window context, wherein the window context includes information pertaining to one or more keywords associated with a window group, which software application spawned a window, and a database object used to provide content for the window;

grouping the one or more open windows based on one or more keywords, wherein the one or more keywords identify a window context and search criteria used to display search results in a search window;

grouping one or more child windows of a parent window with a group of a parent window from which the parent window was spawned;

determining one or more files that include documentation related to one or more open window groups and accompanying windows based upon one or more keywords assigned to the one or more open window groups; and determining files, which when opened belong to a currently selected window group.

2. An apparatus comprising:

one or more processors;

logic encoded in one or more tangible media for execution by the one or more processors and when executed operable for performing operations comprising:

identifying one or more open windows of plural software applications, wherein the one or more open windows include a first open window and a second open window that are displayed simultaneously;

determining keywords associated with the one or more open windows by passing the one or more open windows through Optical Character Recognition (OCR) software;

accessing one or more rules pertaining to one or more behaviors or characteristics of the one or more open windows, wherein the one or more rules include at least one rule specifying that the one or more open windows shall be grouped into a window group in accordance with one or more keywords associated with the window group and occurring in each open window;

using the one or more rules to adjust the one or more behaviors in accordance with the one or more keywords, wherein corresponding data displayed in each open window of the window group is synchronized without synchronizing one or more second open windows of another window group;

dynamically updating which window grouping a particular window belongs to based on changes to content of the particular window;

detecting user selection of the first open window;

populating a search field of the second open window based on keywords pertaining to the first open window in response to the detecting of the user selection of the first open window; and performing a search of at least a backup service based on the keywords from the search field;

providing a user option to adjust the one or more keywords;
displaying a search window with a user option to enter a query, wherein the one or more keywords represent search criteria supplied in a search field of a search window, wherein the query includes a keyword of the one or more keywords, and providing search results in response to the query, wherein the search results identify one or more documents, and further including associating the one or more documents with one or more window groups associated with the keyword;
assigning a window displaying one or more of the documents to a window group associated with the keyword included in the query;
providing a user option to enable display of search results in the search window based on a user selected window, a window group associated with the user selected window, and one or more keywords associated with the window group;
adjusting the one or more behaviors by grouping the one or more open windows in accordance with the one or more rules;
providing a user option to adjust the one or more rules, wherein the one or more rules includes a rule specifying that application windows are to be dynamically grouped into one or more window groups in accordance with content present in each application window, wherein the one or more window groups include one or more sub-groups, wherein the one or more rules include a rule specifying that windows shall be grouped in accordance with one or more keywords associated with each window group and occurring in each of the one or more open windows, and further including changing a window group when content of one of the windows in window group changes, and wherein the content includes one or more keywords associated with one or more window groups;
assigning a window to plural window groups when the window meets grouping criteria for different window groups;
grouping one or more window groups in accordance with an application from which the one or more window groups were spawned;
providing a user option to control behaviors of the one or more open windows in accordance with window context, wherein the window context includes information pertaining to one or more keywords associated with a window group, which software application spawned a window, and a database object used to provide content for the window;
grouping the one or more open windows based on one or more keywords, wherein the one or more keywords identify a window context and search criteria used to display search results in a search window;
grouping one or more child windows of a parent window with a group of a parent window from which the parent window was spawned;
determining one or more files that include documentation related to one or more open window groups and accompanying windows based upon one or more keywords assigned to the one or more open window groups; and
determining files, which when opened belong to a currently selected window group.

3. One or more non-transitory machine-readable media including instructions executable by a processor for performing operations comprising:

identifying one or more open windows of plural software applications, wherein the one or more open windows include a first open window and a second open window that are displayed simultaneously;
determining keywords associated with the one or more open windows by passing the one or more open windows through Optical Character Recognition (OCR) software;
accessing one or more rules pertaining to one or more behaviors or characteristics of the one or more open windows, wherein the one or more rules include at least one rule specifying that the one or more open windows shall be grouped into a window group in accordance with one or more keywords associated with the window group and occurring in each open window;
using the one or more rules to adjust the one or more behaviors in accordance with the one or more keywords, wherein corresponding data displayed in each open window of the window group is synchronized without synchronizing one or more second open windows of another window group;
dynamically updating which window grouping a particular window belongs to based on changes to content of the particular window;
detecting user selection of the first open window;
populating a search field of the second open window based on keywords pertaining to the first open window in response to the detecting of the user selection of the first open window; and
performing a search of at least a backup service based on the keywords from the search field;
providing a user option to adjust the one or more keywords;
displaying a search window with a user option to enter a query, wherein the one or more keywords represent search criteria supplied in a search field of a search window, wherein the query includes a keyword of the one or more keywords, and providing search results in response to the query, wherein the search results identify one or more documents, and further including associating the one or more documents with one or more window groups associated with the keyword;
assigning a window displaying one or more of the documents to a window group associated with the keyword included in the query;
providing a user option to enable display of search results in the search window based on a user selected window, a window group associated with the user selected window, and one or more keywords associated with the window group;
adjusting the one or more behaviors by grouping the one or more open windows in accordance with the one or more rules;
providing a user option to adjust the one or more rules, wherein the one or more rules includes a rule specifying that application windows are to be dynamically grouped into one or more window groups in accordance with content present in each application window, wherein the one or more window groups include one or more sub-groups, wherein the one or more rules include a rule specifying that windows shall be grouped in accordance with one or more keywords associated with each window group and occurring in each of the one or more open windows, and further including changing a window group when content of one of the windows in window group changes, and wherein the content includes one or more keywords associated with one or more window groups;

assigning a window to plural window groups when the window meets grouping criteria for different window groups;

grouping one or more window groups in accordance with an application from which the one or more window groups were spawned;

providing a user option to control behaviors of the one or more open windows in accordance with window context, wherein the window context includes information pertaining to one or more keywords associated with a window group, which software application spawned a window, and a database object used to provide content for the window;

grouping the one or more open windows based on one or more keywords, wherein the one or more keywords identify a window context and search criteria used to display search results in a search window;

grouping one or more child windows of a parent window with a group of a parent window from which the parent window was spawned;

determining one or more files that include documentation related to one or more open window groups and accompanying windows based upon one or more keywords assigned to the one or more open window groups; and determining files, which when opened belong to a currently selected window group.

* * * * *

UNITED STATES PATENT AND TRADEMARK OFFICE
CERTIFICATE OF CORRECTION

PATENT NO.         : 10,261,650 B2
APPLICATION NO.    : 14/032136
DATED              : April 16, 2019
INVENTOR(S)        : Musa et al.

Page 1 of 1

It is certified that error appears in the above-identified patent and that said Letters Patent is hereby corrected as shown below:

In the Specification

In Column 1, Line 10, delete "May" and insert -- Mar. --, therefor.

In Column 4, Line 63, delete "Similarly, aPage: 8" and insert -- Similarly, --, therefor.

In Column 4, Lines 64-67, delete "user interface control signal may be any signal that is provided as input for software, wherein the input affects a user interface display screen and/or accompanying software application associated with the software." and insert the same on Column 4, Line 63, as a continuation of the same paragraph.

In Column 32, Line 23, delete "that that" and insert -- that --, therefor.

Signed and Sealed this
Third Day of November, 2020

Andrei Iancu
*Director of the United States Patent and Trademark Office*